US011133964B2

(12) United States Patent
Ernström et al.

(10) Patent No.: US 11,133,964 B2
(45) Date of Patent: Sep. 28, 2021

(54) FREQUENCY OFFSET ESTIMATION

(71) Applicant: Telefonaktiebolaget LM Ericsson (publ), Stockholm (SE)

(72) Inventors: Per Ernström, Stockholm (SE); Håkan Björkegren, Täby (SE); Mattias Frenne, Uppsala (SE); Lars Lindbom, Karlstad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/622,493

(22) PCT Filed: Jun. 15, 2018

(86) PCT No.: PCT/EP2018/065954
§ 371 (c)(1),
(2) Date: Dec. 13, 2019

(87) PCT Pub. No.: WO2018/229255
PCT Pub. Date: Dec. 20, 2018

(65) Prior Publication Data
US 2021/0051048 A1 Feb. 18, 2021

Related U.S. Application Data

(60) Provisional application No. 62/521,367, filed on Jun. 16, 2017.

(51) Int. Cl.
*H04L 5/12* (2006.01)
*H04L 27/00* (2006.01)
*H04L 5/00* (2006.01)

(52) U.S. Cl.
CPC ........ *H04L 27/0014* (2013.01); *H04L 5/0048* (2013.01); *H04L 2027/0016* (2013.01);
(Continued)

(58) Field of Classification Search
CPC ............... H04L 27/0014; H04L 5/0048; H04L 2027/0016; H04L 2027/0026; H04L 2027/0067
(Continued)

(56) References Cited

U.S. PATENT DOCUMENTS 7,751,503 B2    7/2010  Lawrow et al.
2004/0202234 A1  10/2004  Wang
(Continued)

FOREIGN PATENT DOCUMENTS

EP    2736208 A2    5/2014
WO    2010060732 A1    6/2010

OTHER PUBLICATIONS

Unknown, Author, et al., "3rd Generation Partnership Project; Technical Specification Group Radio Access Network; Evolved Universal Terrestrial Radio Access (E-UTRA); Physical channels and modulation (Release 14)", 3GPP TS 36.211 V14.2.0, Mar. 2017, pp. 1-194.
(Continued)

*Primary Examiner* — Helene E Tayong
(74) *Attorney, Agent, or Firm* — Murphy, Bilak & Homiller, PLLC

(57) ABSTRACT

A radio node (14) is configured to perform frequency offset estimation. The radio node (14) in this regard receives a first set (22-1) of reference symbols of a reference signal during respective time resources, and determines a first frequency offset estimate (26-1) using the first set (22-1) of reference symbols. The radio node (14) also receives a second set (22-2) of 5 reference symbols of the reference signal during respective time resources, e.g., using the same local oscillator frequency for down conversion as with the first set (22-1). The radio node (14) further determines, based on the first frequency offset estimate (26-1), a second frequency
(Continued)

offset estimate (26-2) using the second set (22-2) of reference symbols. In some embodiments, the radio node (14) determines a third frequency offset estimate as a sum of the first and 10 second frequency offset estimates, and tunes a local oscillator frequency, or performs frequency offset compensation, based on the third frequency offset estimate.

28 Claims, 11 Drawing Sheets

(52) U.S. Cl.
CPC .................. *H04L 2027/0026* (2013.01); *H04L 2027/0067* (2013.01)

(58) Field of Classification Search
USPC .......................................................... 375/262
See application file for complete search history.

(56) References Cited

U.S. PATENT DOCUMENTS

| | | | |
|---|---|---|---|
| 2013/0010704 A1* | 1/2013 | Kronquist | H04W 52/50 370/329 |
| 2013/0114535 A1 | 5/2013 | Ng et al. | |
| 2013/0121246 A1 | 5/2013 | Guey et al. | |
| 2013/0170590 A1* | 7/2013 | Hyll | H04L 27/2686 375/343 |
| 2017/0374549 A1 | 12/2017 | Anil et al. | |
| 2018/0199388 A1 | 7/2018 | Tabet et al. | |
| 2018/0279394 A1 | 9/2018 | Peng et al. | |

OTHER PUBLICATIONS

Unknown, Author, "Draft Report of 3GPP TSG RAN WG1 #89 v0.1.0 (Hangzhou, China, May 15-19, 2017)", 3GPP TSG RAN WG1 Meeting #90; R1-171xxxx; Prague, Czech Rep, Aug. 21-25, 2017, pp. 1-162.

Unknown, Author, "On DL PTRS design", 3GPP TSG-RAN WG1 #89; R1-1708707; Hangzhou, China May 15-19, 2017, pp. 1-9.

Unknown, Author, "WF on RS design requirement for fine time and frequency tracking", 3GPP TSG RAN WGI #89; R1-1709640; Hangzhou, China, May 15-19, 2017, pp. 1-10.

* cited by examiner

FREQUENCY OFFSET ESTIMATION

BACKGROUND

A receiver in a wireless communication system receives a signal by performing down-conversion of the signal to baseband using a local oscillator (LO) tuned to a certain frequency. Due to oscillator imperfections on both the transmitter and the receiver side, and due to Doppler shift of the signal, the frequency to which the receiver's LO is tuned may differ from the frequency at which the signal was transmitted. That is, there may be an offset between the receiver's LO frequency and the transmitted signal's frequency.

To maintain a proper frequency reference for its oscillator, the receiver performs frequency offset estimation so as to estimate the deviation of the LO frequency from the actual frequency of the transmitted signal, e.g., based on measurements of a known reference signal. The resulting frequency offset estimate may then be used to adjust the reference frequency in the oscillator to keep it from drifting away from the correct designated frequency, to compensate processing performed on the received signal, or both. In this way, the receiver effectively tracks the frequency of the received signal using a reference signal.

These and other uses of a reference signal prove to be challenging in some contexts where the overhead and/or interference attributable to a reference signal must be balanced with performance (e.g., frequency offset estimation accuracy).

SUMMARY

One or more embodiments herein include a method performed by a radio node (e.g., a wireless device or a radio network node) for frequency offset estimation. The method comprises receiving a first set of reference symbols of a reference signal during respective time resources, and determining a first frequency offset estimate using the first set of reference symbols. The method also comprises receiving a second set of reference symbols of the reference signal during respective time resources, and determining, based on the first frequency offset estimate, a second frequency offset estimate using the second set of reference symbols.

In some embodiments, the first set of reference symbols is a subset of the second set of reference symbols. Alternatively or additionally, at least one reference symbol may be included in the first set is also included in the second set.

In one or more embodiments, the first and second sets of reference symbols are received using the same local oscillator frequency for down conversion, e.g., the local oscillator frequency is not re-tuned between the first and second estimates.

In some embodiments, determining the second frequency offset estimate comprises determining, based on the first frequency offset estimate, a phase of each reference symbol in the second set within a phase range greater than $2\pi$. Such determination may also comprise calculating the second frequency offset estimate as a rate at which the determined phases vary over the time resources during which the second set of reference symbols are received.

In one such embodiment, for instance, determining the phase of each reference symbol in the second set based on the first frequency offset estimate comprises rotating the reference symbols in the second set based on the first frequency offset estimate and determining the phase of each reference symbol in the second set as rotated. In this case, determining the phase of each reference symbol in the second set as rotated may comprise determining symbol-to-symbol phase changes over time across the reference symbols in the second set as rotated, with symbol-to-symbol phase changes being within a set of possible phase changes that has a range of $2\pi$; and determining, for each reference symbol in the second set, the phase of that reference symbol within a set of possible phases that has a range greater than $2\pi$ by calculating a partial sum of the symbol-to-symbol phase changes up to the time resource during which that reference symbol was received.

In another embodiment, determining the phase of each reference symbol in the second set based on the first frequency offset estimate may comprise determining symbol-to-symbol phase changes over time across the reference symbols in the second set, with symbol-to-symbol phase changes being within a set of possible phase changes that has a range of $2\pi$ and that is calculated based on the first frequency offset estimate; and determining, for each reference symbol in the second set, the phase of that reference symbol within a set of possible phases that has a range greater than $2\pi$ by calculating a partial sum of the symbol-to-symbol phase changes up to the time resource during which that reference symbol was received.

In some embodiments, determining the first frequency offset estimate comprises determining a phase of each reference symbol in the first set within a phase range greater than $2\pi$ and calculating the first frequency offset estimate as a rate at which the determined phases vary over the time resources during which the first set of reference symbols are received. In one such embodiment, determining the phase of each reference symbol in the first set comprises determining symbol-to-symbol phase changes over time across the reference symbols in the first set, with symbol-to-symbol phase changes being within a set of possible phase changes that has a range of $2\pi$; and determining, for each reference symbol in the first set, the phase of that reference symbol within a set of possible phases that has a range greater than $2\pi$ by calculating a partial sum of the symbol-to-symbol phase changes up to the time resource during which that reference symbol was received.

In any of these embodiments, the method may further comprise determining a third frequency offset estimate as a sum of the first and second frequency offset estimates. In some embodiments, the method may also comprise tuning a local oscillator frequency, or performing frequency offset compensation, based on the third frequency offset estimate.

In some embodiments, the first and second sets of reference symbols are received using different local oscillator frequencies for down conversion, with the local oscillator frequency used to receive the second set of reference symbols being based on the first frequency offset estimate.

In some embodiments, the first set of reference symbols are received during respective time resources in a first set of time resources, and the second set of reference symbols are received during respective time resources in a second set of time resources. In some embodiments, the first set of time resources includes a first pair of time resources that are separated from one another in time by a first separation distance, with no reference symbol of the reference signal on any time resource between the first pair of time resources. Also, the second set of time resources includes a second pair of time resources that are separated from one another in time by a second separation distance, with no reference symbol of the reference signal on any radio resource between the second pair of time resources. In some of these embodiments, the second separation distance is at least twice as large as the first separation distance.

In some embodiments, time resources on which the reference signal is received occur in periodically recurring bursts. In one such embodiment, the first and second sets of reference symbols are received in the same burst. In fact, in some embodiments, the first set of reference symbols occurs before the second set of reference symbols in the same burst.

In some embodiments, transmissions are performed in the wireless communication system according to a time slot structure in which each of multiple time slots includes multiple time resources. In one such embodiment, a burst spans multiple consecutive time slots.

Embodiments also include corresponding apparatus, computer programs, and carriers of such computer programs. Embodiments for example include a radio node configured for use in a wireless communication system. The radio node is configured to receive a first set of reference symbols of a reference signal during respective time resource and determine a first frequency offset estimate using the first set of reference symbols. The radio node is also configured to receive a second set of reference symbols of the reference signal during respective time resources. The radio node is further configured to determine, based on the first frequency offset estimate, a second frequency offset estimate using the second set of reference symbols as received or compensated based on the first frequency offset estimate.

In some embodiments, an irregular, or variable, temporal pattern is used for the reception of reference signals that are used for frequency estimation. The temporal pattern is such that there is a subset (referred to as G) of reference signals that are received spaced closely in time (e.g. closely spaced OFDM symbols) while in general these reference signals are received more sparsely spaced in time.

More specifically, the maximum time between consecutive signals in the subset G of reference signals should be such that aliasing is unlikely to occur based on the initial frequency estimate. The maximum time between consecutive signals in the set of all reference signals on the other hand can be allowed to be so large that aliasing is likely to occur based on the initial frequency estimate but should be small enough for aliasing to be avoidable with the help of a frequency estimate based on the subset G of reference signals.

On the receiver side frequency may be estimated in two steps. First, the frequency is estimated based on the subset G of the reference signals. Next, the frequency is estimated based on the full set of reference signals making use of the frequency estimate in the first step to avoid aliasing. That is, some embodiments include a two-step estimation method where the frequency estimate from the first step is used to avoid aliasing in the second step.

Note that in some embodiments no re-tuning of the receiver oscillator needs to be done between the estimation steps.

In some embodiments, a method is performed in a wireless terminal configured (by default, or by RRC or by RRC+DCI) to receive (measure on) reference signals to perform frequency offset estimation. The reference signals are received in bursts, where a burst contains a set S of reference signal symbols and is further divided into a subset G of the set S of reference signal symbols, having a maximum symbol spacing smaller than the maximum symbol spacing of the set S. In one or more of these embodiments, the wireless terminal resolves phase ambiguity using the subset of G reference signal symbols and where the maximum symbol spacing of the subset G is smaller than the maximum reference signal symbol spacing of the set S.

Some embodiments give a better frequency estimation accuracy for a given reference signal overhead than currently used methods or alternatively the same frequency estimation accuracy as currently used methods but with a lower reference signal overhead

DETAILED DESCRIPTION

Figure 1:
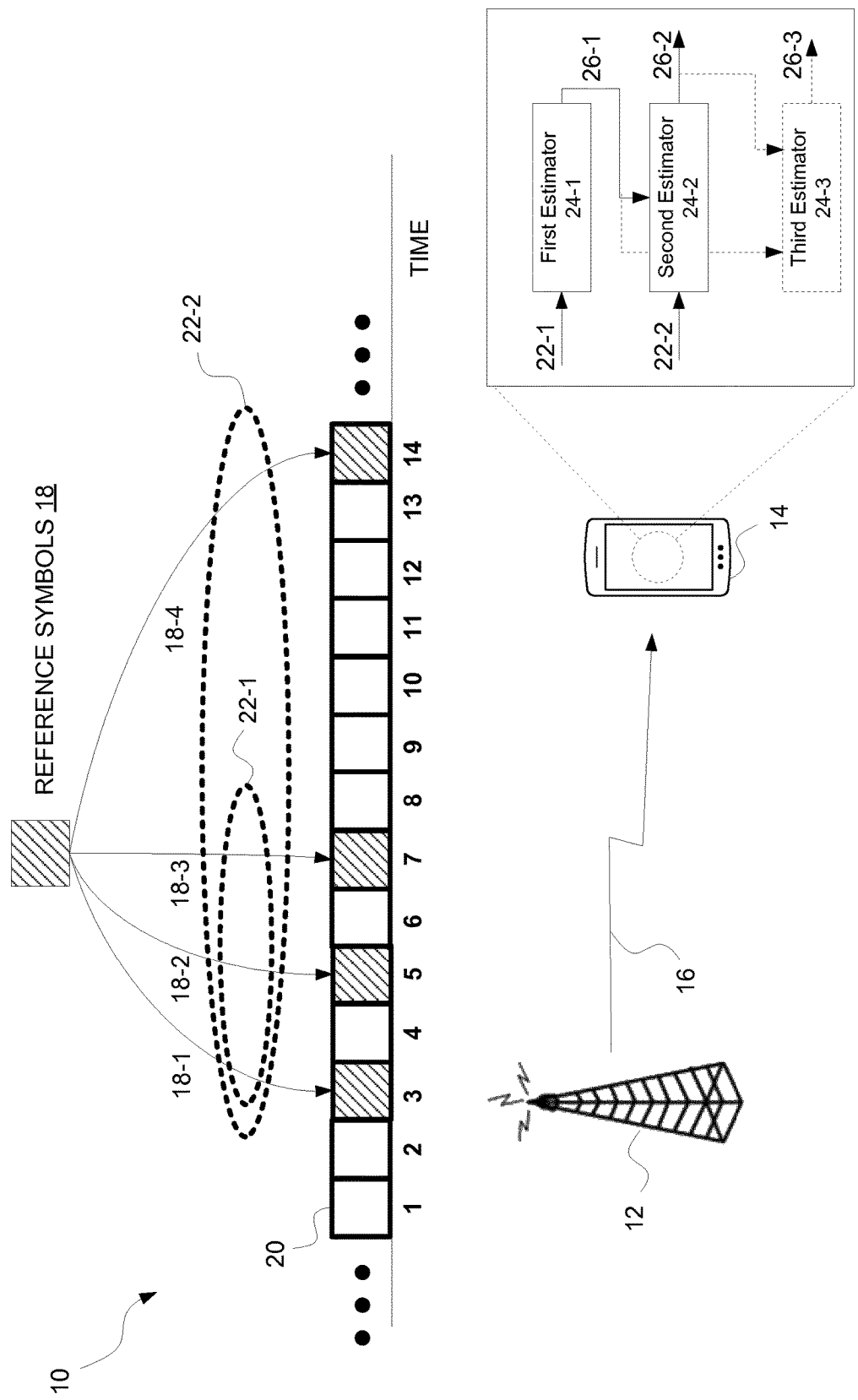
FIG. 1 is a block diagram of a wireless communication system according to some embodiments.

FIG. 1 shows a wireless communication system 10 according to some embodiments. The system 10 includes a transmit radio node 12 configured to transmit a reference signal 16 to a receive radio node 14. FIG. 1 for instance shows the transmit radio node 12 in the form of a radio network node (e.g., a base station) and shows the receive radio node 14 in the form of a wireless device such as a user equipment, e.g., such that the reference signal 16 constitutes a downlink reference signal.

This reference signal 16 in some embodiments may be a tracking reference signal (TRS) configured for use by the receive radio node 14 for time and/or frequency tracking (e.g., frequency offset estimation). In one embodiment in this regard, the reference signal 16 is transmitted phase coherently such that all symbols of the reference signal 16 are transmitted with the same precoder, i.e., on the same antenna port.

In any event, FIG. 1 shows that the reference signal 16 comprises multiple reference symbols 18, e.g., in a certain sequence or series. These reference symbols 18 (e.g., in the form of Orthogonal Frequency Division Multiplexing, OFDM, symbols) are transmitted by the transmit radio node 12 and received by the receive radio node 14 on respective time resources 20 defined in the time domain. FIG. 1 in this regard shows reference symbols 18 received on time resources 20 that are indexed for instance by indices 3, 5, 7, and 14. In some embodiments, no reference symbol 18 of the reference signal 16 is transmitted or received on any of the other time resources 20 shown in FIG. 1, e.g., as these resources may instead be used for user data, control data, or other types of reference signals.

More particularly, FIG. 1 shows that the receive radio node 14 receives a first set 22-1 of reference symbols 18 that includes reference symbols 18-1, 18-2, and 18-3, e.g., as received on respective time resources 3, 5, and 7. These reference symbols in the first set 22-1 may for instance have a maximum inter-symbol distance of two symbols as shown. FIG. 1 also depicts the receive radio node 14 receives a second set 22-2 of reference symbols 18 that includes symbols 18-1, 18-2, 18-3, and 18-4, e.g., as received on respective time resources 3, 5, 7, and 14. In this case, therefore, the first set 22-1 is a subset of the second set 22-2. These reference symbols in the second set 22-2 may for instance have a maximum inter-symbol distance of seven symbols as shown (i.e., between symbol 18-3 and 18-4). In some embodiments, therefore, the first and second sets 22-1, 22-2 are associated with different spacings, patterns, and/or density of reference symbols 18.

The receive radio node 14 according to some embodiments herein exploits the first and second sets 22-1, 22-2 of reference symbols 18 to estimate frequency offset, e.g., via an iterative process. As shown in this regard, the receive radio node 14 includes a first estimator 24-1 that determines a first frequency offset estimate 26-1 using the first set 22-1 of reference symbols 18. The first estimator 24-1 provides this first frequency offset estimate 26-1 to a second estimator 24-2. The second estimator 24-2 determines, based on the first frequency offset estimate 26-1, a second frequency offset estimate 26-6 using the second set 22-2 of reference symbols 18.

In some embodiments, the receive radio node 14 further includes a third estimator 24-3 that determines a third frequency offset estimate 26-3 as a function of (e.g., sum of) the first and second frequency offset estimates 24-1, 24-2.

Figure 2:
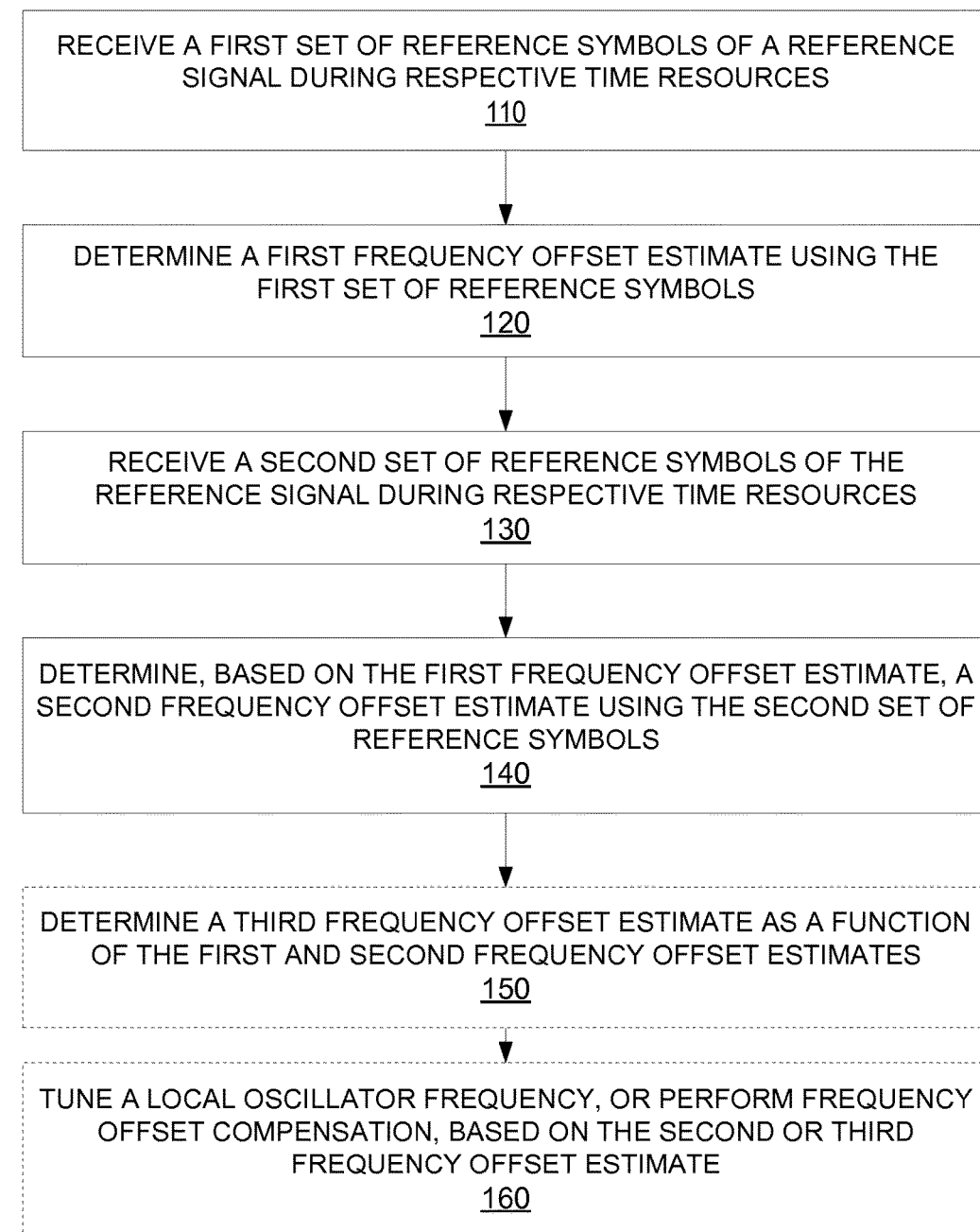
FIG. 2 is a logic flow diagram of a method performed by a radio node according to some embodiments.

FIG. 2 correspondingly illustrates a method 200 performed by a receive radio node 14 according to some embodiments. The method 100 includes receiving a first set 22-1 of reference symbols of a reference signal 16 during respective time resources (Block 110), and determining a first frequency offset estimate 26-1 using the first set 22-1 of reference symbols (Block 120). The method 100 also includes receiving a second set 22-2 of reference symbols of the reference signal 16 during respective time resources (Block 130), and determining, based on the first frequency offset estimate 26-1, a second frequency offset estimate 26-2 using the second set 22-2 of reference symbols (Block 140). In some embodiments, the method 200 further includes determining a third frequency offset estimate 26-3 as a function of (e.g., sum of) the first and second frequency offset estimates 26-1 and 26-2 (Block 150). Alternatively or additionally, the method 200 in some embodiments further includes tuning a local oscillator frequency, or performing frequency offset compensation, based on the second frequency offset estimate 26-2 (or the third frequency offset estimate 26-3 if such was determined) (Block 160).

One or more of these embodiments advantageously prove robust against errors due to phase ambiguity or aliasing, while not compromising estimation accuracy for a given reference signal overhead. For example, in some embodiments, the first frequency offset estimate 26-1 is used to receive, (at least partially) compensate, or otherwise pre-process the second set 22-2 of reference symbols to reduce the risk that phase ambiguity or aliasing will occur when using the second set 22-2 of reference symbols to determine the second frequency offset estimate 26-2.

In any event, in some embodiments like the one shown in FIG. 1, the first set 22-1 of reference symbols is a subset of the second set 22-2. In other embodiments, at least one reference symbol included in the first set is also included in the second set.

In these and other embodiments, therefore, the first and second sets of reference symbols are received using the same local oscillator frequency for down conversion. That is, the receive radio node 14 in some embodiments does not re-tune the local oscillator frequency between determining the first and second estimates. In these and other embodiments, the receive radio node 14 may instead compensate or pre-process the second set 22-2 of reference symbols to resolve, eliminate, or mitigate phase ambiguity or aliasing.

Figure 3:
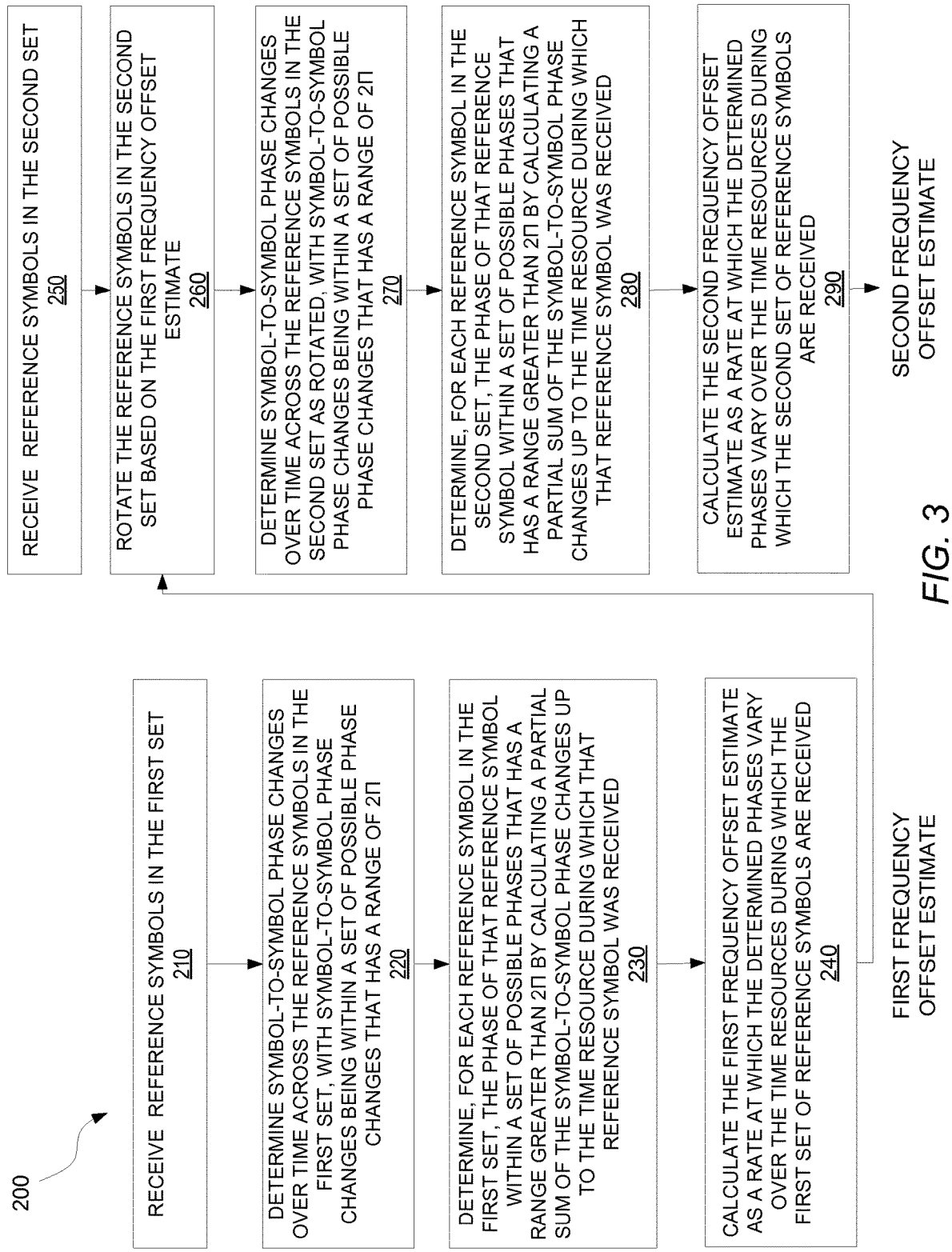
FIG. 3 is a logic flow diagram of a method performed by a radio node according to other embodiments.

FIG. 3 illustrates some embodiments in this regard. As shown, after receiving the reference symbols in the first set 22-1 (Block 210), the receive radio node 14 calculates the first frequency offset estimate 26-1 using that first set 22-1 of reference symbols in Blocks 220-240. In particular, the receive radio node 14 determines symbol-to-symbol phase changes over time across the reference symbols in the first set 22-1, with symbol-to-symbol phase changes being within a set of possible phase changes that has a range of $2\pi$ (Block 220). The receive radio node 14 then determines, for each reference symbol in the first set 22-1, the phase of that reference symbol within a set of possible phases that has a range greater than $2\pi$ (e.g., so as to resolve any phase ambiguity) by calculating a partial sum of the symbol-to-symbol phase changes up to the time resource during which that reference symbol was received (Block 230). The receive radio node 14 then calculates the first frequency offset estimate 26-1 as a rate at which the determined phases vary over the time resources during which the first set 22-1 of reference symbols are received (Block 240).

The receive radio node 14 then determines the second frequency offset estimate 26-2 based on the first frequency offset estimate 26-1. In particular, after receiving reference symbols in the second set 22-2 (Block 250), the receive radio node 14 3 rotates the reference symbols in the second set 22-2 based on the first frequency offset estimate 26-1 (Block 260). Then, to determine the phase of each reference symbol in the second set 22-2 as rotated, the receive radio node 14 determines symbol-to-symbol phase changes over time across the reference symbols in the second set 22-2 as rotated, with symbol-to-symbol phase changes being within a set of possible phase changes that has a range of $2\pi$ (Block 270). The receive radio node 14 then determines, for each reference symbol in the second set 22-2, the phase of that reference symbol within a set of possible phases that has a range greater than $2\pi$ by calculating a partial sum of the symbol-to-symbol phase changes up to the time resource during which that reference symbol was received (Block 280). Next, the receive radio node 14 calculates the second frequency offset estimate 26-2 as a rate at which the determined phases vary over the time resources during which the second set 22-2 of reference symbols are received (Block 290).

In other embodiments not show, though, the receive radio node 14 determines the phase of each reference symbol in the second set 22-2 based on the first frequency offset estimate 26-1 by determining symbol-to-symbol phase changes over time across the reference symbols in the second set 22-2, with symbol-to-symbol phase changes being within a set of possible phase changes that has a range of $2\pi$ and that is calculated based on the first frequency offset estimate 26-1. The receive radio node 14 then determines, for each reference symbol in the second set 22-2, the phase of that reference symbol within a set of possible phases that has a range greater than $2\pi$ by calculating a partial sum of the symbol-to-symbol phase changes up to the time resource during which that reference symbol was received.

In still other embodiments, the first and second sets 22-1, 22-2 of reference symbols are received using different local oscillator frequencies for down conversion. In this case, though, the local oscillator frequency used to receive the second set 22-2 of reference symbols may be based on the first frequency offset estimate 26-1. That is, the receive radio node 14 may adjust the local oscillator frequency used to receive the second set 22-2 of reference symbols, based on the first frequency offset estimate 26-1.

Figure 4:
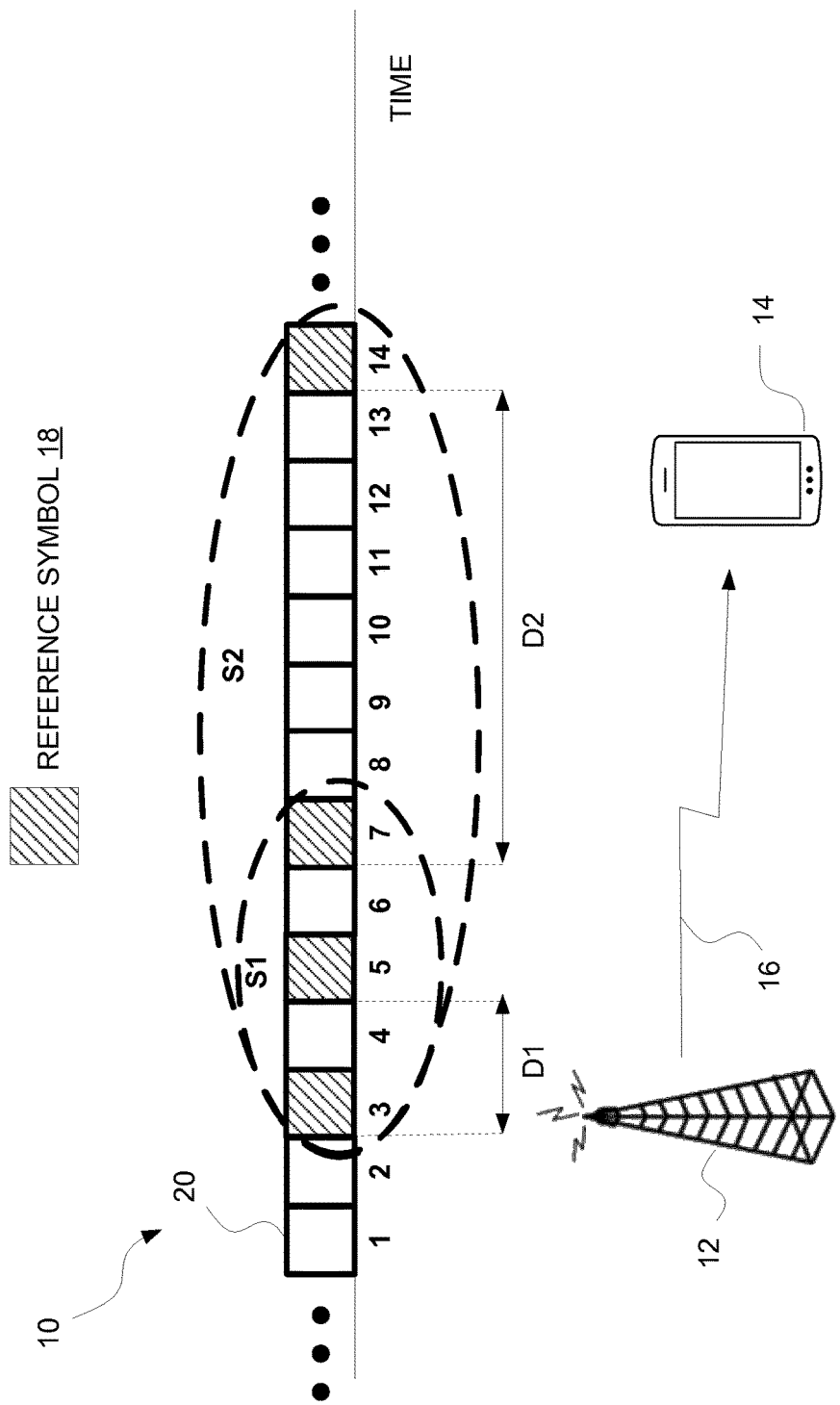
FIG. 4 is a block diagram of a wireless communication system according to other embodiments.

Some embodiments exploit the reference signal 16 having certain properties, such as irregular inter symbol separation or density. FIG. 4 illustrates one example exploitable by the embodiments herein.

The time resources 20 on which the reference symbols 18 may be transmitted and received may more specifically include a first set S1 of time resources and a second set S2 of time resources. The first and second sets S1, S2 may differ in at least one time resource, e.g., the sets S1, S2 may be mutually exclusive or may partially overlap in terms of one or more time resources. With partial overlap of the sets S1, S2, at least one time resource included in the first set S1 may be also included in the second set S2. In fact, in some embodiments, the partial overlap is realized in that the first set S1 is a subset of the second set S2. FIG. 4 illustrates one example of such embodiments by showing that the time resources 20 on which the reference symbols 18 are received include a first set S1 and a second set S2. The first set S1 as shown includes time resources 3, 5, and 7, whereas the second set S2 includes time resources 3, 5, 7, and 14, i.e., the first set S1 is a subset of the second set S2.

With the sets S1, S2 differing in at least one time resource 20, the sets may be associated with different spacings, patterns, and/or densities of time resource in the time domain for carrying reference symbols 18, e.g., such that the reference symbol resource density varies over time. The sets S1, S2 in this regard may for instance be associated with different maximum separation distances in the time domain between time resources 20 that carry reference symbols 18.

In some embodiments, for instance, the first set S1 includes a first pair of time resources that are separated from one another in time by a first separation distance D1, with no reference symbol of the reference signal 16 on any time resource between the first pair of time resources in the time domain (i.e., the time resources in the first pair occur consecutively in an ordering of those time resources that carry reference symbols 18 in the time domain, ignoring time resources that do not carry such reference symbols 18). And the second set S2 includes a second pair of time resources that are separated from one another in the time domain by a second separation distance D2, with no reference symbol of the reference signal on any time resource between the second pair of time resources in the time domain. According to some embodiments herein, the second separation distance D2 is different than the first separation distance D1. In some embodiments, for instance, the second separation distance D2 is at least twice as large as the first separation distance D1. In other embodiments, the second separation distance D2 is at least three times as large as the first separation distance D1. In still other embodiments, the second separation distance D2 is at least five times as large as the first separation distance D1.

FIG. 4 for instance shows that the first set S1 includes time resources 3, 5, and 7 which occur consecutively one after another in the time domain with respect to time resources that carry reference symbols 18 of the reference signal 16, i.e., they are shown as non-consecutive with respect to all time resources including non-reference-symbol time resources 4 and 6 intervening between them, but consecutive with respect to only time resources 3, 5, 7, and 14 that carry reference symbols of the reference signal 16. In this case, then, the first set S1 includes two pairs of consecutive time resources: one pair that includes time resources 3 and 5 and another pair that includes time resources 5 and 7. Each of these pairs do not have any time resource between them that carries a reference symbol of the reference signal 16. Each pair is formed from time resources that are separated from one another in the time domain by a first separation distance D1, shown here as being 2 time resources (i.e., 5−3=2).

Similarly, FIG. 1 shows that the second set S2 includes time resources 3, 5, 7, and 14 which occur consecutively one after another in the time domain with respect to time resources that carry reference symbols 18 of the reference signal 16. This second set S2 differs in that it includes three pairs of consecutive time resources: one pair that includes time resources 3 and 5, another pair that includes time resources 5 and 7, and yet another pair that includes time resources 7 and 14. Whereas pairs 3-5 and 5-7 have the first separation distance D1, the pairing of resources 7 and 14 are separated by a second separation distance D2, shown as being equal to 7 time resources (i.e., 14−7=7). In this case, then, the second separation distance D2 is actually more than twice as large as the first separation distance D1. In fact, the second separation distance D2 is at least three times as large as the first separation distance D1 (i.e., D2>N*D1, such that N=3 in this example where D1=2 and D2=7).

Note that in this example, the first and second separation distances D1, D2 constituted the maximum separation distance among the pairs of time resources in each respect set S1, S2. This maximum separation distance in a sense characterizes or reflects a density of the time resources used for carrying reference symbols 18 of the reference signal 16. In general, therefore, according to some embodiments herein where the first set S1 includes one or more pairs of time resources that are each separated from one another in the time domain by a respective separation distance, with no reference symbol of the reference signal 16 on any time resource between that pair of time resources in the time domain, the first separation distance D1 is a maximum separation distance among the one or more respective separation distances of the one or more pairs included in the first set S1. Similarly, where the second set S2 includes one or more pairs of time resources that are each separated from one another in the time domain by a respective separation distance, with no reference symbol of the reference signal on any time resource between that pair of time resources in the time domain, the second separation distance is a maximum separation distance among the one or more respective separation distances of the one or more pairs included in the second set S2. In this case, then, the maximum separation distance of the second set S2 may be at least two times, three times, five times, etc. the maximum separation distance of the first set S1.

With the reference symbol time resources spaced in this way, some embodiments herein facilitate frequency tracking by the receive radio node 14. Indeed, in some embodiments, the first separation distance D1 is less than or equal to an ambiguity or alias inducing separation distance which when exceeded ambiguity or aliasing in the estimated phases of the reference symbols will or is (more) likely to occur. And the second separation distance is greater than the ambiguity or aliasing inducing separation distance, in favor of increased estimate accuracy or range. The ambiguity or aliasing inducing separation distance (e.g., in seconds) may be for instance one half divided by the actual, estimated, worst-case, or assumed error in the local oscillator frequency (Hz) with which the reference symbols on the first set S1 of time resources are or are assumed to be received. In any event, with the reference signal 16 transmitted or received in this way, some embodiments herein give a better frequency estimation accuracy for a given reference signal overhead than currently used methods or alternatively the same frequency estimation accuracy as currently used methods but with a lower reference signal overhead.

Accordingly, in some embodiments, the receive radio node 14 may perform frequency tracking using reference symbols received on the first set S1 of time resources in order to obtain a first frequency offset estimate that is immune or less susceptible to error due to aliasing or phase ambiguity at the local oscillator frequency. The receive radio node 14 may then use the reference symbols received on the second set S2 of time resources in conjunction with the first frequency offset estimate in order to obtain a second frequency offset estimate that has greater possible accuracy or range than the first estimate.

Figure 5:
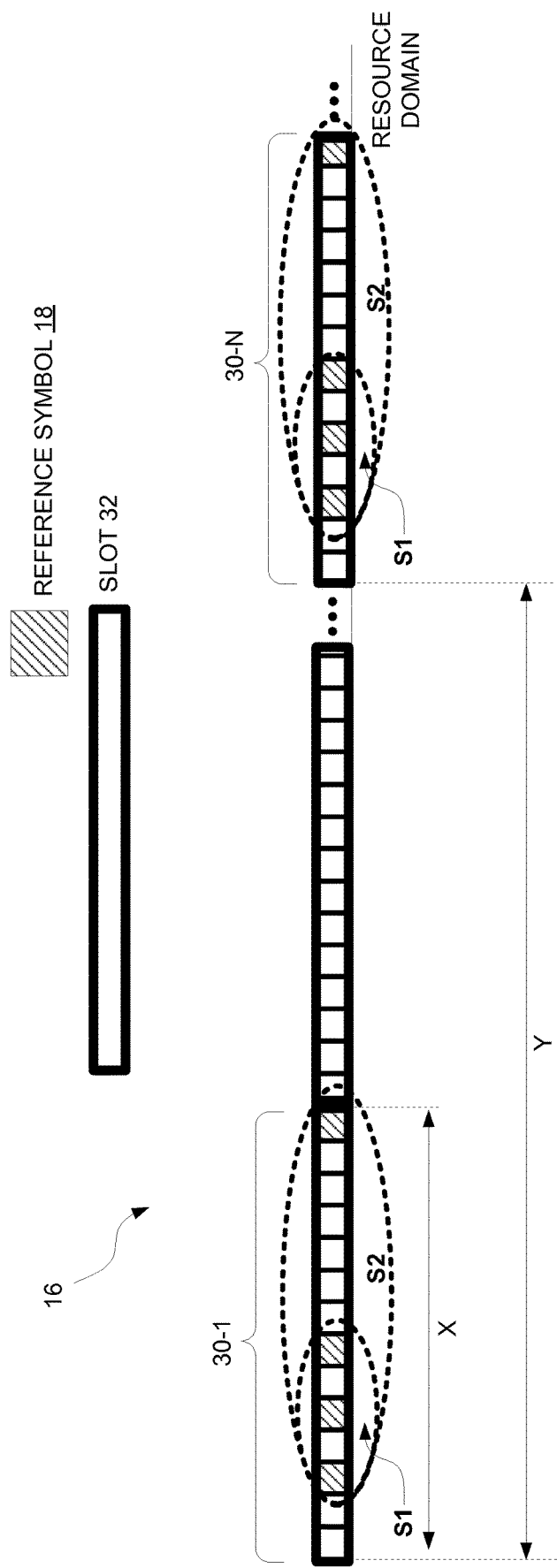
FIG. 5 is a block diagram of a reference signal transmitted or received in periodically recurring bursts according to some embodiments.

Note that, in some embodiments, radio resources on which the reference signal 16 is transmitted or received occur in periodically recurring bursts, e.g., such that the reference signal 16 is effectively transmitted or received in periodically recurring bursts. In one embodiment, for example, FIG. 4 illustrates just one of multiple periodically recurring bursts. FIG. 5 illustrates the periodicity with which the bursts occur according to one example.

FIG. 5 shows multiple bursts 30-1 . . . 30-N (referred to generally as bursts 30). Each burst 30 spans X=14 symbols, which as shown constitutes a single time slot 32. Four reference symbols 18 are included in each burst 30, e.g., as shown in FIG. 4 such that reference symbols 18 are transmitted or received on symbols 3, 5, 7, and 14 of each burst 30. The bursts 30 periodically recur with a periodicity Y (e.g., every Y slots). No reference symbols 18 of the reference signal 16 are transmitted between successive bursts 30. In the example of FIG. 5, then, the first set S1 and second set S2 of radio resources on which reference symbols 18 are transmitted or received are included in the same burst 30. That is, for any given recurrence of the reference symbols 18, each of the reference symbol radio resources included in the first set S1 is included in the same burst 30 as the burst within which are included each of the reference symbol radio resources included in the second set S2. Or, in other words, any given burst 30 includes each reference symbol radio resource in the first set S1 as well as each reference symbol radio resource in the second set S2. FIG. 5 for example shows that each of the reference symbol radio resources in first set S1 is included in burst 30-1 and each of the reference symbol radio resources in the second set S2 is also included in that same burst 30-1. In this case, the first set S1 occurs before the second set S2 in the same burst. The same may be said for burst 30-N; that is, each reference symbol radio resource in first set S1 is included in burst 30-N and each reference symbol radio resource in the second set S2 is also included in that same burst 30-N.

Effectively, this means that any given burst 30 itself provides different spacings, patterns, and/or densities of radio resource for carrying reference symbols 18, e.g., such that the reference symbol radio resource density varies within any given burst 30. In some embodiments, then, any given burst 30 includes some reference symbol radio resources (e.g., in S1) that are separated by less than the ambiguity or alias inducing separation distance as well as some reference symbol radio resources (e.g., in S2) that are separated by greater than or equal to the ambiguity or alias inducing separation distance. The receive radio node 14 may thereby exploit both separation distances within any given burst 30 for performing frequency offset estimation.

Of course, although FIG. 5 showed a burst 30 as spanning only a single time slot 32, a burst 30 in other embodiments may span multiple consecutive time slots 32. Even with a burst 30 spanning multiple time slots 32, the first and second sets S1, S2 may nonetheless still be included in the same burst 30 in some embodiments.

In other embodiments not shown, though, the first and second sets S1, S2 may be included in different bursts. For example, where the first and second sets S1, S2 are mutually exclusive, the first set S1 may be included only in one burst and the second set S2 may be included only in another burst. That is, all reference symbol radio resources in the first set S1 may be included in one burst whereas all reference symbol radio resources in the second set S2 may be included in a different bust. The receive radio node 14 in this case may exploit different separation distances within different respective bursts for performing frequency offset estimation.

Although some embodiments herein have been illustrated with first and second sets of reference symbols that differ in at least one reference symbol, other embodiments herein apply where the first and second sets are the same. That is, the embodiments iteratively determine successive frequency offset estimates using the same set of reference symbols.

Moreover, although some embodiments herein have been illustrated with reference symbols that have variable or irregular inter-symbol spacing, other embodiments herein apply where the symbols have fixed or regular inter-symbol spacing.

Still further, some embodiments re-tune the oscillator frequency between the first and second estimates. In this case, the re-tuning reduces error in the frequency offset of the receiver so as to mitigate or lessen the risk of phase ambiguity or aliasing that would otherwise affect the second frequency offset estimate.

A radio node herein is any type of node capable of communicating over radio signals. A radio network node herein is any type of network node (e.g., a base station) capable of communicating with another node over radio signals. A wireless device is any type device capable of communicating with a radio network node or another wireless device over radio signals. A wireless device may therefore refer to a machine-to-machine (M2M) device, a machine-type communications (MTC) device, a NB-IoT device, etc. A wireless device may also be referred to as a radio device, a radio communication device, a wireless terminal, or simply a terminal—unless the context indicates otherwise, the use of any of these terms is intended to include device-to-device devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. It should be understood that these devices may be user equipments, but are generally configured to transmit and/or receive data without direct human interaction.

In an IOT scenario, a wireless device as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless device as described herein may be comprised in a vehicle and may perform monitoring and/or reporting of the vehicle's operational status or other functions associated with the vehicle.

The term separation distance refers to a distance separating radio resources on which reference symbols are transmitted or received. Separation distance may thus correspond to inter symbol distance.

Note that a radio node (e.g., a receive radio node 14) as described above may perform the processing herein by implementing any functional means or units. In one embodiment, for example, the radio node comprises respective circuits configured to perform the steps shown in FIGS. 2 and/or 3. The circuits in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more microprocessors, carries out the techniques described herein.

Figure 6A:
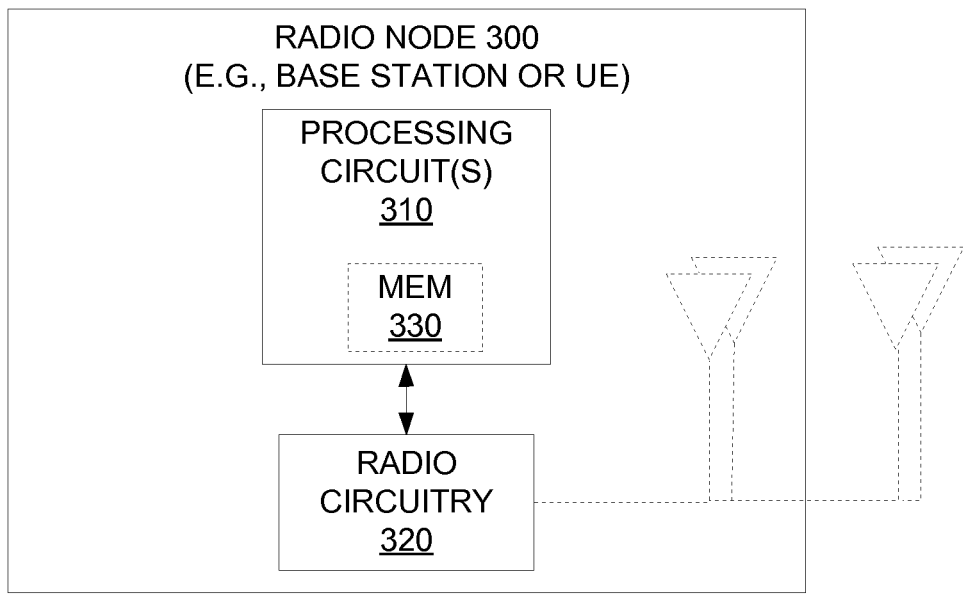
FIG. 6A is a block diagram of a radio node according to some embodiments.

FIG. 6A illustrates additional details of a radio node 300 in accordance with one or more embodiments. As shown, the radio node 300 includes one or more processing circuits 310 and radio circuitry 320. The radio circuitry 320 may be configured to transmit and/or receive via one or more antennas that are internal and/or external to the radio node 300. The one or more processing circuits 310 are configured to perform processing described above, e.g., in FIGS. 2 and/or 3, such as by executing instructions stored in memory 330. The one or more processing circuits 310 in this regard may implement certain functional means or units.

Figure 6B:
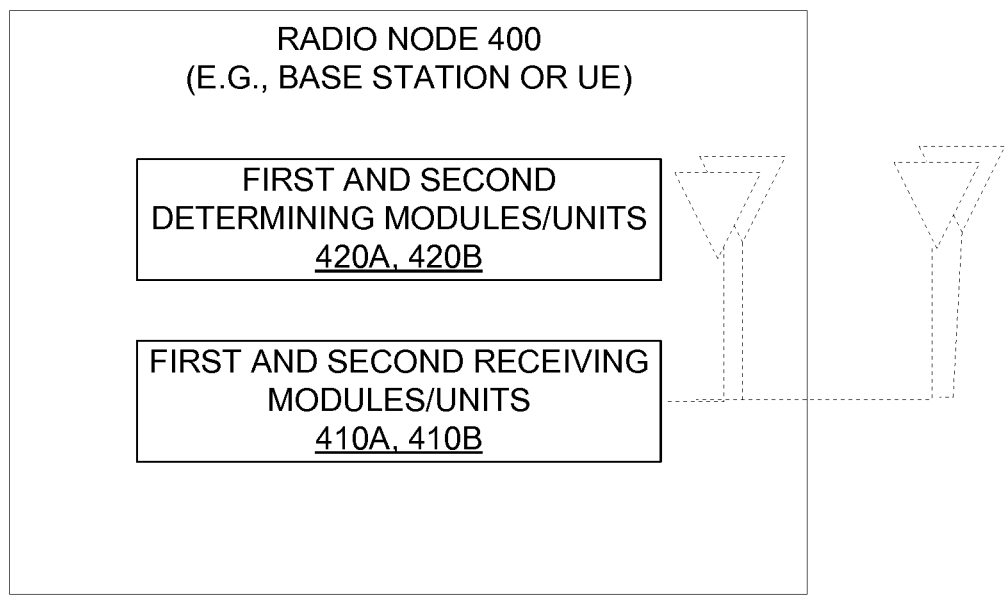
FIG. 6B is a block diagram of a radio node according to other embodiments.

FIG. 6B in this regard illustrates additional details of a radio node 400 in accordance with one or more other embodiments. Specifically, the radio node 400 may include first and second receiving modules or units 410A, 410B for receiving the first and second sets of reference symbols in Blocks 110 and 130 of FIG. 2. The radio node 400 may further include first and second determining modules or units 420A, 420B for determining the first and second frequency offset estimates in Blocks 120 and 140 of FIG. 2. One or more of these modules or units may be implemented by the one or more processing circuits 310 in FIG. 6A.

Those skilled in the art will also appreciate that embodiments herein further include corresponding computer programs.

A computer program comprises instructions which, when executed on at least one processor of a radio node, cause the radio node to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

Some embodiments will now be described in more detail in a context where the reference signal 16 may be configured for or usable in a 5G or New Radio (NR) wireless communication system. Despite explanation in the context of 5G in these and other embodiments, it will be appreciated that the techniques may be applied to other wireless networks. Thus, references herein to signals using terminology from the 3GPP standards should be understood to apply more generally to signals having similar characteristics and/or purposes, in other networks.

Currently a new 'fifth generation' radio access technology referred to as NR is being developed and specified in 3GPP. One important aspect of this technology is to avoid "always-on" signals, i.e. reference signals transmitted in every subframe, as far as possible. This is in order to avoid creating unnecessary interference, reduce energy consumption and also to make it easier in the future to introduce new technology modes unrestricted by the existence of always-on signals that need to be kept for backwards-compatibility reasons.

This is based on experience from the fourth-generation technology Long Term Evolution (LTE). In LTE, cell reference signals (CRS) are always transmitted (in every downlink subframe), irrespectively of whether the cell is serving any user with data and it has been seen to limit system performance in some scenarios. In LTE, the CRS is utilized for multiple purposes including measurements, frequency offset estimation and time synchronization as well as being used for demodulation of physical downlink channels. Even though the intention is to avoid specifying mandatory transmission of always-on signals like CRSs in NR, the critical functionalities of time synchronization and frequency offset estimation must be supported.

In NR, it's therefore crucial to design configurable reference signals that support these critical functionalities like frequency offset estimation and time synchronization in a way that balance the need for accuracy in frequency offset estimation and time synchronization versus reference signal overhead and overall system performance.

Due to oscillator imperfections, both on the transmitter and the receiver side, and because of Doppler shift of the signal, there is a need for the receiver to estimate the carrier frequency of the received signal. The estimated frequency is used to down convert the signal to baseband. An error in the estimate will result in a time-dependent phase in the equivalent base band signal:

$$b(t) = b_0(t) \cdot e^{-i \cdot 2\pi \cdot f_{err} \cdot t}$$

Here, $b_0(t)$ is the equivalent baseband signal resulting from down conversion with the true received frequency $f_c$ and $b(t)$ is the equivalent baseband signal resulting from down conversion with the estimated frequency $f_{est} = f_c + f_{err}$.

Figure 7:
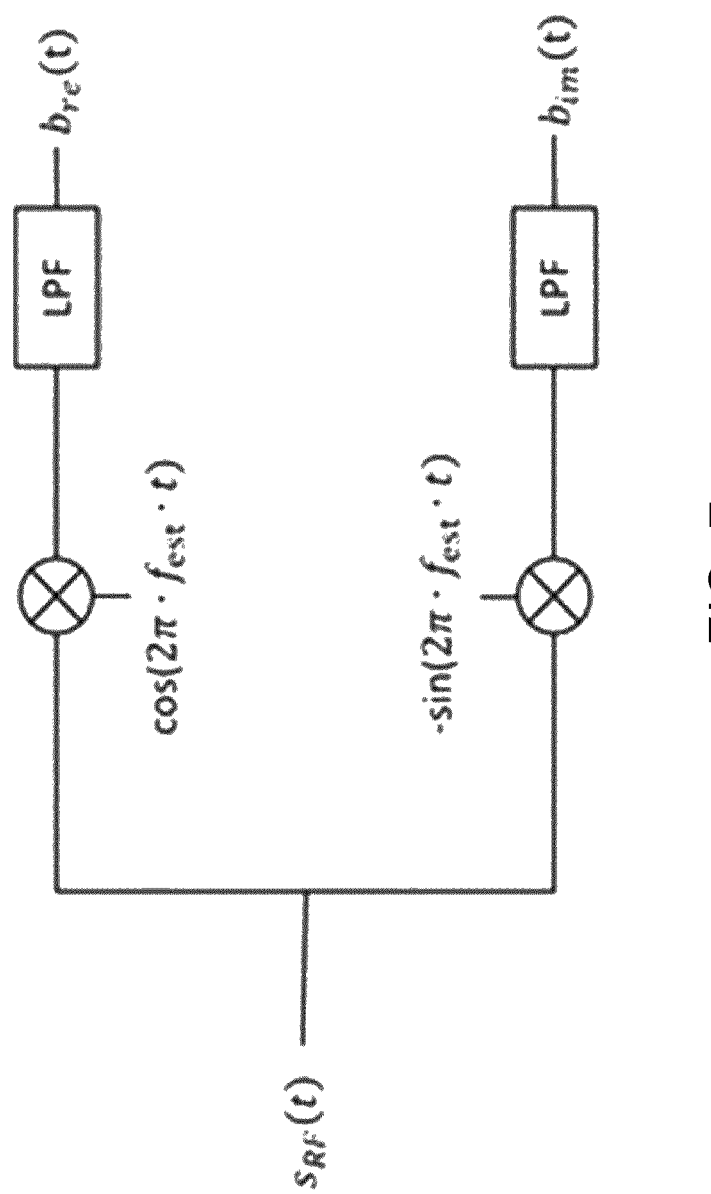
FIG. 7 is a block diagram of down conversion of a radio frequency signal into an equivalent baseband signal according to some embodiments.

FIG. 7 in this regard shows down conversion of an RF signal $s_{RF}(t) = I(t) \cdot \cos(2\pi \cdot f_c \cdot t) - Q(t) \cdot \sin(2\pi \cdot f_c \cdot t)$ into an equivalent baseband signal $b(t) = b_{re}(t) + i \cdot b_{im}(t)$. With a perfect frequency estimate $f_{est} = f_c$, the equivalent baseband signal $b(t) = b_0(t) = I(t) + i \cdot Q(t)$. With an imperfect frequency estimate $f_{est} = f_c + f_{err}$, however the equivalent baseband signal $b(t) = b_0(t) \cdot e^{-i \cdot 2\pi \cdot f_{err} \cdot t}$.

In Orthogonal Frequency Division Multiplexing (OFDM), a discrete Fourier transform is performed (typically using a Fast Fourier Transform, FFT, algorithm) of the time-sampled baseband signal for each OFDM symbol. Here, the error in the frequency estimate will result in: (i) a phase difference between the OFDM symbols (a factor $e^{-i \cdot 2\pi \cdot f_{err} \cdot t_n + i \cdot \theta}$ where $t_n$ is the time of the start of the n'th OFDM symbol); and (ii) a mixing of the Fourier coefficients as compared with the Fourier coefficents resulting from down conversion with the true received frequency. This may be viewed as inter-subcarrier interference.

Frequency estimation may be performed based on estimating how fast the phase changes in the equivalent baseband signal resulting from down conversion with the current best estimate of the frequency. If the estimate is based on known reference signals with large separation in time, then the phase difference to estimate will be large and a larger phase in comparison to noise will improve accuracy. A large separation in time between consecutive reference signals increases the risk for aliasing however. Indeed, the instantaneous phase is only defined up to $2\cdot\pi$ and thus the phase difference between two consecutive reference signals becomes ambiguous if $$|f_{err}|\cdot \Delta t > \frac{1}{2},$$

where $\Delta t$ is in seconds and where $|f_{err}|$ is the accuracy of the current frequency estimate in Hz (taking noise into account, phase ambiguity can occur also for $$\Delta t < \frac{1}{2\cdot|f_{err}|}$$

but the probability is smaller for small $\Delta t$). Here, the ambiguity or aliasing inducing separation distance may be equal to $$\frac{1}{2|f_{err}|}.$$

To achieve a large separation in time and at the same time avoiding aliasing, the reference signal used for frequency estimation according to some embodiments herein is transmitted repeatedly over a long time span with a time difference between consecutive signals that is smaller than $$\frac{1}{2\cdot|f_{err}|}.$$

A UE in NR may get a first rough frequency estimate based on a synchronization block sent with a certain frequency, say every 20 ms or 40 ms. This will give a frequency estimate with an accuracy of say 5% of the subcarrier spacing (the design of the synchronization block is not yet settled and UE requirements are not set). This is far from sufficient for high performance reception and additional reference signals are needed for frequency estimation. In NR this reference signal will most likely be used for multiple purposes such as e.g. time tracking, delay spread estimation and Doppler spread estimation.

Introducing a downlink reference signal for time and/or frequency tracking is necessary but introduces overhead as these resources must be taken from resources used for data transmission. It also creates interference to other cells which degrades system performance. It is thus a problem how to balance resource overhead with demodulation and system performance.

According to embodiments herein, an irregular, or variable, temporal pattern is used for the transmission and reception of reference signals that are used for frequency estimation. The temporal pattern is such that there is a subset (call it G) of reference signals that are transmitted spaced closely in time (e.g. closely spaced OFDM symbols) while in general these reference signals are transmitted more sparsely spaced in time.

More specifically, the maximum time between consecutive signals in the subset G of reference signals should be such that aliasing is unlikely to occur based on the initial frequency estimate. The maximum time between consecutive signals in the set of all reference signals on the other hand can be allowed to be so large that aliasing is likely to occur based on the initial frequency estimate but should be small enough for aliasing to be avoidable with the help of a frequency estimate based on the subset G of reference signals.

On the receiver side, the frequency is estimated in two steps according to some embodiments. First, the frequency is estimated based on the subset G of the reference signals. Next, the frequency is estimated based on the full set of reference signals making use of the frequency estimate in the first step to avoid aliasing.

Some embodiments therefore include a tracking reference signal (TRS) burst pattern consisting of a sub-pattern that is dense in time and thus robust towards aliasing given an initial frequency estimate.

In one embodiment, a method in a wireless communication network comprises transmitting reference signals to perform frequency offset estimation, where the reference signals are transmitted in bursts and where a burst contains a set S of reference signal symbols and is further divided into a subset G of the set S of reference signal symbols, having a maximum symbol spacing smaller than the maximum symbol spacing of the set S.

In another embodiment, a method in a wireless terminal comprises receiving (measuring on) reference signals to perform frequency offset estimation, where the reference signals are received in bursts and where a burst contains a set S of reference signal symbols and is further divided into a subset G of the set S of reference signal symbols, having a maximum symbol spacing smaller than the maximum symbol spacing of the set S. The wireless terminal may be configured in this way by default, or by radio resource control (RRC), or by RRC in combination with downlink control information (DCI).

In yet another embodiment, a method in a wireless terminal comprises resolving phase ambiguity using the subset of G reference signal symbols, where the maximum symbol spacing of the subset G is smaller than the maximum reference signal symbol spacing of the set S.

Figure 8:
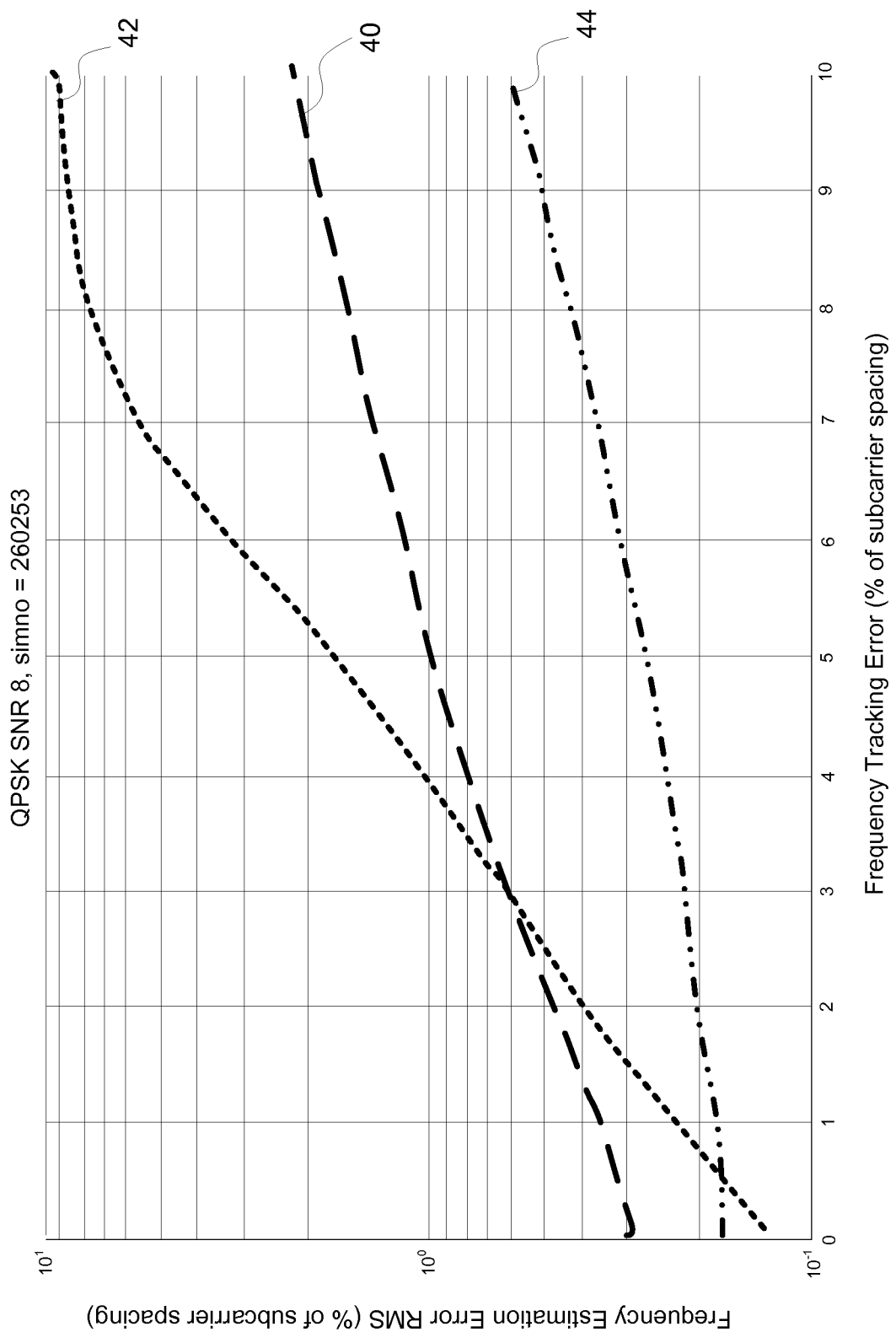
FIG. 8 is a graph of frequency offset estimation error according to some embodiments.
Figure 9:
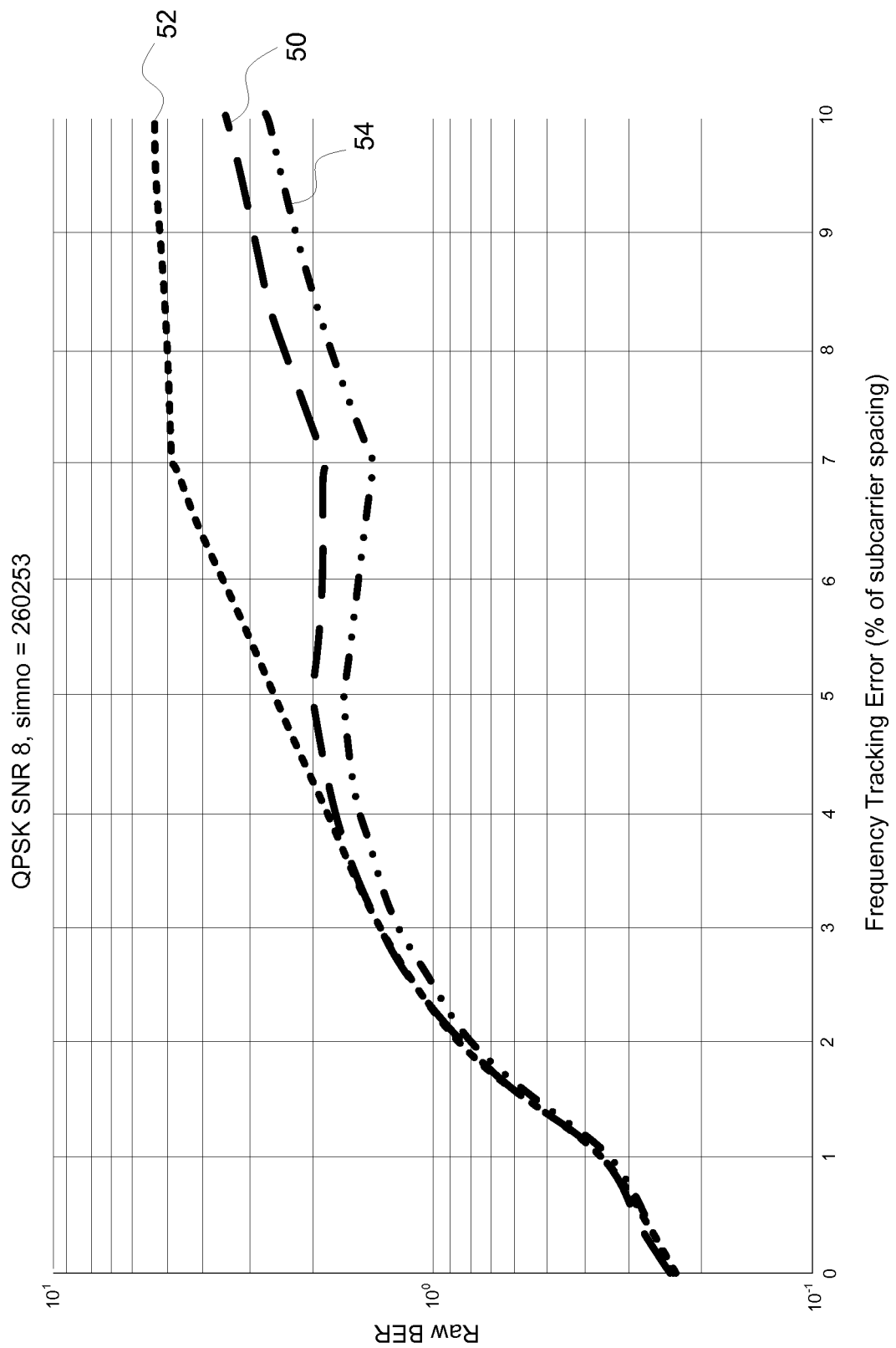
FIG. 9 is a graph of raw bit error rate according to some embodiments.

Some embodiments give a better frequency estimation accuracy for a given reference signal overhead than currently used methods or alternatively the same frequency estimation accuracy as currently used methods but with a lower reference signal overhead. This can be seen in FIGS. 8 and 9. FIG. 8 in this regard shows frequency offset estimation error RMS as a function of the frequency offset. This is shown as line 40 for one step estimation based on TRS in symbol 3, 5, 7 and 9, line 42 for one step estimation based on TRS in symbol 3, 5, 7 and 14, and line 44 for two step estimation based on TRS in symbol 3, 5, 7 and 14 using symbol 3, 5, and 7 in the first-step estimation and symbol 3, 5, 7 and 14 in the second-step estimation. FIG. 9 shows raw bit error rate (BER) as a function of the initial frequency offset after re-tuning the receiver oscillator based on the frequency estimation. Line 50 shows raw BER for one step frequency estimation based on TRS in symbol 3, 5, 7 and 9. Line 52 shows raw BER for one step frequency estimation based on TRS in symbol 3, 5, 7 and 14. And line 54 shows raw BER for two step frequency estimation based on TRS in symbol 3, 5, 7 and 14 using symbol 3, 5, and 7 in the first step estimation and symbol 3, 5, 7 and 14 in the second step estimation.

In more detail, denote the reference signal used for frequency estimation by Tracking Reference Signal (TRS). The TRS is defined as a burst of S OFDM symbols with a certain symbol spacing between OFDM symbols having TRS. Each TRS burst has a total time extent of T OFDM symbols and may span one or multiple slots.

In the case of an OFDM based system a subset of the subcarriers is used for the TRS resource elements (RE) in each symbol used to carry the TRS. One example of mapping in the frequency domain is when the subcarriers used for TRS in an OFDM symbol are equally spaced across the transmission bandwidth, also known as a comb based structure. Also, the transmission bandwidth of the TRS may be smaller than the system bandwidth. For example, the TRS in some embodiments spans only 10 MHz while the system bandwidth is 80 MHz.

Moreover, the TRS burst can be configured to be sent periodically with some periodicity, for example starting every Y:th slot. Each TRS burst has a length of X slots. In each TRS burst, a set S of OFDM symbols are used to carry the TRS, denoted as the S "TRS symbols" below.

Figure 10:
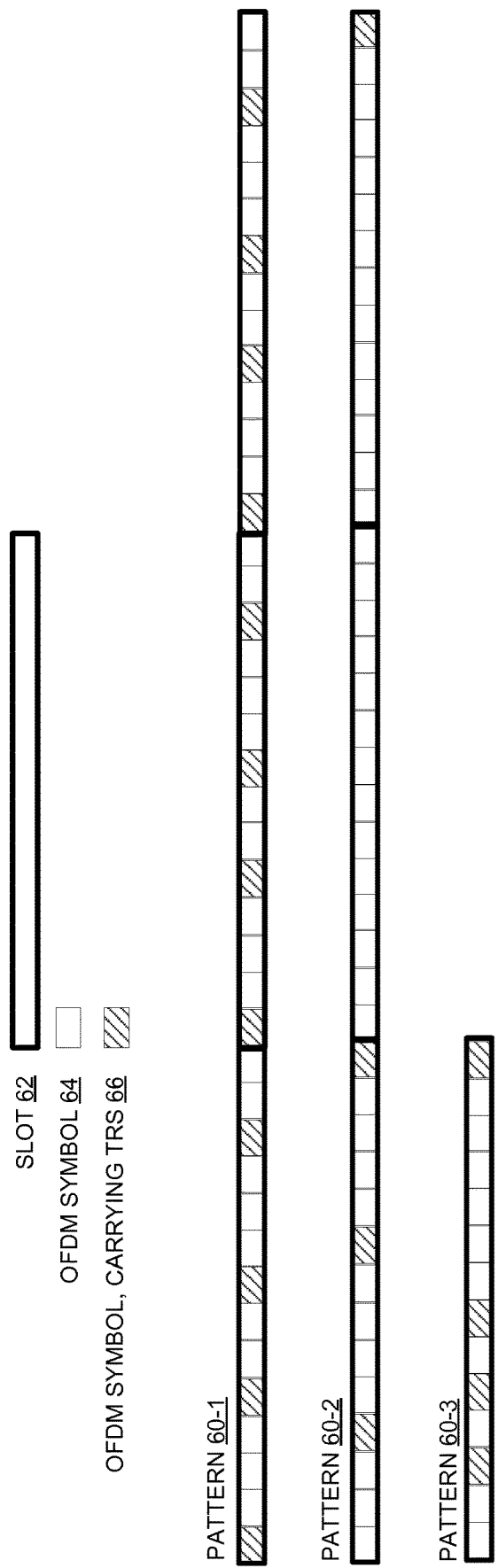
FIG. 10 is a block diagram of different possible patterns for the mapping of a reference signal onto OFDM symbols according to some embodiments.

As an example, consider a slot with 14 OFDM symbols in which the TRS is mapped to S=12 OFDM symbols over X=3 slots. FIG. 10 shows one such pattern 60-1 for the mapping of a TRS burst onto OFDM symbols. As shown, according to pattern 60-1, OFDM symbols 66 carrying the TRS include symbols 1, 5, 8, and 12 of each of the three slots 62 in the TRS burst. The other OFDM symbols in three slots are OFDM symbols 64 that do not carry TRS. Hence, 12 out of 3*14=42 OFDM symbols carry the TRS. The remaining 42−12=30 OFDM symbols carry other transmissions such as physical downlink channels and other signals e.g. physical downlink control channel (PDCCH), physical downlink shared channel (PDSCH), channel state information reference signal (CSI-RS), etc. It is also possible that these "other transmissions" are mapped to the same OFDM symbols as the TRS symbols but to other resource elements.

Some embodiments introduce a time-variable TRS density in order to reduce the overhead and unnecessary interference. Some embodiments focus on time density and related frequency offset estimation, but the same principle holds for frequency density and time synchronization.

In one embodiment, the variable time density occurs within a TRS burst. For example, the TRS symbol density is higher in one part (e.g. the beginning) of the TRS burst but sparser in another part (e.g. the end) of the TRS burst. More specifically, the TRS burst is constructed so that there is a subset G of the set S of TRS symbols that are used to carry the TRS for which the maximum time between consecutive TRS symbols is significantly smaller than the maximum time between consecutive TRS symbols in the full set S.

The time density can also be controlled on a slot basis, in case a TRS burst uses multiple adjacent slots. In one example, the first slot in the TRS burst has high TRS density, e.g. with OFDM symbol spacing 2 between consecutive TRS symbols, while the following slots in the TRS burst have lower TRS density, e.g. with OFDM symbol spacing 4 between consecutive TRS symbols. Hence, the UE can make accurate frequency offset estimation based on the first slot in the TRS burst and then make further adjustments on the TRS symbols in the remaining slots in the TRS burst. The benefit of this approach is that each slot has a single TRS symbol time density and density changes at the slot boundary only, which simplifies PDSCH to resource element (RE) mapping.

FIG. 10 shows a more concrete example in the form of a pattern 60-2. As shown for pattern 60-2, a TRS burst is mapped on S=4 OFDM symbols within X=3 slots with 14 OFDM symbols each. In particular, symbol numbers 4, 9, 14 and 32 carry the TRS burst. The full set S has a maximum time between consecutive TRS symbols equal to 28 symbol times (32−4), while the subset consisting of symbols 4, 9 and 14 has a smaller maximum time between consecutive TRS symbols equal to five symbol times (14−9=9−4).

FIG. 10 shows yet another example in the form of a pattern 60-3. As shown for pattern 60-3, a TRS burst is mapped on S=4 OFDM symbols within X=1 slots with 14 OFDM symbols. In particular, symbol numbers 3, 5, 7 and 14 carry the TRS burst. The full set S has a maximum time between consecutive TRS symbols equal to 7 symbol times (14−7), while the subset consisting of symbols 3, 5 and 7 has a smaller maximum time between consecutive TRS symbols equal to two symbol times (7−5=5−3).

In another embodiment, the variable time density occurs between TRS bursts. Hence, some TRS bursts have higher time density between TRS symbols in the TRS burst than other TRS bursts. For example, the periodicity of TRS bursts is Y slots and every N:th burst has high time density (OFDM symbols carrying TRS symbol is dense) while the in-between N−1 bursts have low time density (including the case that this low density TRS burst only has a single OFDM symbol containing TRS symbol, to allow for mainly time synchronization). The TRS bursts transmitted in-between may thus have different time durations with respect to every N:th TRS burst.

A TRS configuration, comprising the TRS burst parameters and its periodicity (Y), may be fixed in standard (e.g., 3GPP) specifications or configured using higher layer signaling such as RRC signaling. A UE may also have multiple, different TRS's configured for different purposes. For example, the UE may have one default TRS burst, given by specification, that gives the frequency offset estimate accuracy (and time synchronization) sufficient to demodulate system information and to perform RRC configuration. The UE may also have a second TRS burst, which is UE specifically configured by RRC, to obtain a more accurate time frequency tracking performance necessary for higher order modulation (e.g. 256 QAM) and multiple input multiple output (MIMO). Note that the UE still needs to know the presence of the default TRS even though the second TRS is configured, in order to know which REs are available for PDSCH and which are occupied by a TRS transmission.

In another embodiment, the presence of TRS symbols in a slot and/or the TRS density is dynamically signaled by downlink control information (DCI) in a control channel in a slot, which may be a broadcast control channel message, such as the group common PDCCH (GC-PDCCH) in the beginning of the slot. Hence, a UE can decode this control channel and will then know whether TRS is present or not in the slot. Another use case of the dynamic signaling is to indicate whether the TRS burst has full density (e.g. regular time density/equal spacing across the whole TRS burst) or reduced density (e.g. according to embodiments described above with irregular density across the TRS burst to reduce overhead). The dynamic signaling allows the network to use the full density in case no UE is scheduled (no PDSCH transmission) as this will not cause any overhead or use the reduced density in case of a UE is scheduled in resources that overlaps with (parts of) the TRS burst.

The benefit of dynamic signaling in a broadcast message is that even if a UE is not scheduled in that slot (by a regular PDCCH containing scheduling assignment), the UE can by decoding this control channel (e.g. GC-PDCCH), use the TRS with the correct density to perform frequency offset estimation. In yet another embodiment related to the previous, a slot contains multiple configured TRS's mapped to orthogonal resources (resource elements). One use case of multiple TRS is a default TRS and one UE specifically configured TRS as discussed earlier, or another use case is transmission from multiple transmission points or multiple antenna panels which may not have the same local oscillator reference, hence one TRS is needed for each such reference. In this case, the control channel such as GC-PDCCH contains an indication (such as an index of set of indices) of which TRS burst or TRS bursts is/are present in the slot and/or which TRS density is used (full or reduced).

In another embodiment, the burst configuration of the TRS depends on whether the UE is in active-mode or in discontinuous reception (DRX) DRX mode. In long DRX cycles, where the UE occasionally wakes up to read PDCCH, the UE can be scheduled with a TRS burst configuration that can both handle relatively large frequency errors and provide accurate estimates. When starting a new transmission, or restarting an old transmission after a long period of silence, it is difficult to make any pre-assumptions about the frequency error. Then it is beneficial in some embodiments to have a second temporary default configuration that is always used when starting a new transmission, or restarting after a certain period of silence. This configuration must thus be able to handle both large frequency errors and good accuracy. Then after a specified time, when synchronization typically is established, this second temporary default configuration is terminated.

According to some embodiments, estimation of the frequency offset at the receiver is performed in the following way:
Step 1: Down conversion of the received signal based on initial frequency estimate
Step 2: In the case of an OFDM based system: OFDM demodulation (FFT)
Step 3: Estimation of the frequency-offset based on the subset G of reference symbols of the reference signal. This gives a first frequency offset estimate $f_1$.
Step 4: Resolve the phase ambiguity based on the first frequency offset estimate
Step 5: Estimation of the frequency-offset based on all reference symbols of the reference signal using the resolved phases from step 4

Figure 11:
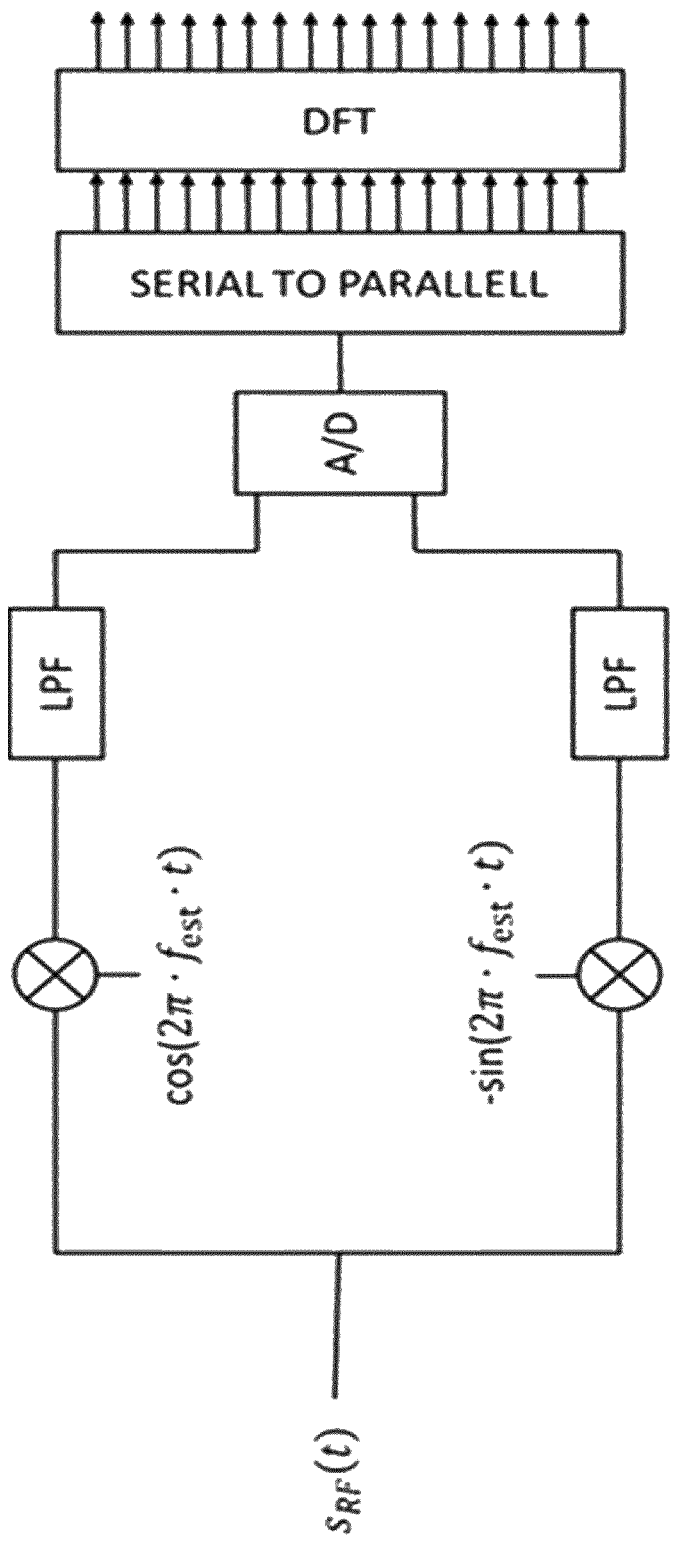
FIG. 11 is a block diagram of down conversion and OFDM demodulation according to some embodiments

FIG. 11 shows the preparatory steps 1 and 2, where the application of a discrete Fourier transform (DFT) is performed typically as a FFT.

Step 4 can be performed in many different but mathematically similar or even equivalent ways. Three embodiments are described below, e.g., where embodiments 1 and 3 implement Block 260 of FIG. 3.

Embodiment 1 for implementing Step 4 entails rotating the received reference signal's Fourier coefficients with a phase by multiplying with $e^{i \cdot 2\pi \cdot f_1 \cdot (t-t_0)}$ where t is the time of the start of the OFDM symbol (not the start of the cyclic prefix, CP) and $t_0$ is an arbitrary reference time.

When performing the frequency estimation as normal using all reference signals in step 5, this gives a second frequency offset estimate $f_2$ that is the residuary frequency offset relative to the first frequency offset estimate $f_1$. The third and final estimate of the frequency offset in this case is calculated as $f_1 + f_2$.

According to embodiment 2 for implementing Step 4, the expected phase difference based on the first frequency estimate $f_1$ between two consecutive TRS symbols is $\Delta\varphi_{est} = f_1 \cdot \Delta t$ where $\Delta t$ is the time difference between the two TRS symbols. In embodiment 2, the receiver calculates the phase difference $\Delta\varphi_{calc}$ between the two symbols based on the received signals resolving the $2\pi$ ambiguity by selecting the phase $\Delta\varphi_{calc}$ in the interval $(\Delta\varphi_{est}-\pi, \Delta\varphi_{est}+\pi]$. The receiver does this for all pairs of consecutive TRS symbols. Partial cumulative sums of $\Delta\varphi_{calc}$ now give global phase information for all TRS symbols.

Embodiment 3 for implementing Step 4 entails rotating the equivalent base band time domain samples by multiplying time sample n with $e^{i \cdot 2\pi \cdot f_1 \cdot t_n}$ where $t_n$ is the time of time sample n. Next, the receiver re-does the OFDM demodulation (FFT) based on the rotated time samples. This embodiment requires more computing power than embodiment 1 and 2 but has the benefit of reducing the inter-subcarrier interference.

Consider now a more detailed example (using embodiment 1 of step 4) where the frequency estimation is performed by linear regression of the phase as a function of time. These embodiments exploit stepwise estimation using the first estimate to avoid aliasing.

Let the TRS burst be sent in symbols $s_i$, i=1,2,3, . . . N counting symbols from the start of the TRS burst. Assume that the maximum time difference between consecutive signals in the subset $G=\{s_i | i=1,2,3, \ldots P\}$ of TRS symbols is small, making aliasing unlikely given the accuracy of the initial frequency estimate used for down conversion. The maximum time difference between consecutive signals in the full set of TRS signals is however larger making aliasing more likely (aliasing becomes likely around $$\frac{1}{2 \cdot f_{acc}}$$

where $f_{acc}$ is a measure of the accuracy of the frequency estimate).

Assume that in each TRS symbol the same subcarriers $c_k$, k=1,2,3, . . . M are used to carry the TRS. Denote the TRS OFDM symbol in subcarrier $c_k$ in symbol $s_i$ by $v_{ki}$ and let $r_{ki}$ be the received OFDM symbol in subcarrier $c_k$ in symbol $s_i$ (after down conversion and OFDM demodulation of the received signal).

Consider now an example of how to determine the first frequency estimate, e.g., as determined according to this example implementation of Blocks 220-240 of FIG. 3. First, the receiver de-rotates the received OFDM symbols to compensate for the TRS signal design:

$$r'_{ki} = \frac{r_{ki}}{v_{ki}}.$$

Note that this step can be omitted if $v_{ki}$ is independent of i, i.e. if the TRS is the same for each symbol i. Next, the receiver calculates the phase between consecutive received TRS symbols in G for each subcarrier k used for the TRS as:

$$\Delta\varphi_{ki} = \arg\left(\frac{r'_{ki+1}}{r'_{ki}}\right),$$

$i=1,2,3,\ldots,P-1$, where the complex argument function arg gives a phase in the interval $(-\pi, \pi]$. This step corresponds to Block 220 of FIG. 3.

Next, the receiver calculates the global phase of each received OFDM symbol in G as a partial sum of the phase differences: $\varphi_{ki}=\arg(r'_{k1})+\Sigma_{m=1}^{i-1}\Delta\varphi_{km}$, $i=1,2,3,\ldots,P$. The range of the global phase is not bound to the interval $(-\pi, \pi]$, i.e., it has a range greater than $2\pi$. This step corresponds to Block 230 of FIG. 3.

Then, for each subcarrier $c_k$ carrying the TRS, the receiver performs linear regression to find the unknowns $a_k$ and $f_{1k}$ in the phase formula: $\varphi_{ki}=a_k-t_i\cdot f_{1k}$, $i=1,2,3,\ldots,P$, where $t_i$ is the time of the end of the CP of symbol i. The receiver then calculates the first frequency offset estimate $f_1$ as the average of $f_{1k}$ over the subcarrier $c_k$. This step corresponds to Block 240 of FIG. 3.

Consider next an example of how to resolve phase ambiguity. The receiver in this example de-rotates all received OFDM symbols: $r''_{ki}=r'_{ki}\cdot e^{i\cdot 2\pi\cdot f_1\cdot t_i}$. This corresponds to Block 260 of FIG. 3, where the second set here constitutes all of the received OFDM symbols. The receiver then calculates the phase between consecutive received TRS symbols for each subcarrier k used for the TRS as:

$$\Delta\varphi'_{ki} = \arg\left(\frac{r''_{ki+1}}{r''_{ki}}\right),$$

$i=1,2,3,\ldots,N$. This corresponds to Block 270 of FIG. 3. Next, the receiver calculates the global phase of each received OFDM symbol as a partial sum of the phase differences: $\varphi'_{ki}=\arg(r''_{k1})+\Sigma_{m=1}^{i-1}\Delta\varphi'_{km}$, $i=1,2,3,\ldots,N$. The range of the global phase is not bound to the interval $(-\pi, \pi]$, i.e., it has a range greater than $2\pi$. This corresponds to Block 280 of FIG. 3.

Consider now an example of how to calculate the second frequency estimate. For each subcarrier $c_k$ carrying the TRS, the receiver performs linear regression to find the unknowns $a'_k$ and $f_{2k}$ in the phase formula: $\varphi'_{ki}=a'_k-t_i\cdot f_{2k}$, $i=1,2,3,\ldots,N$, where $t_i$ is the time of the end of the CP of symbol i. The receiver calculates the second frequency offset estimate $f_2$ as the average of $f_{2k}$ over the subcarrier $c_k$. This corresponds to Block 290 of FIG. 3.

In some embodiments, the receiver then calculates the final frequency offset estimate as $f_1+f_2$. This "final" frequency offset estimate may correspond to the "third" frequency offset estimate described with respect to FIG. 1.

Embodiments herein may be generalized to multiple step estimation. In this case, each estimation is based on a new subset of the full set of TRS signals, where the maximum time between consecutive TRS signals in a given subset would be larger than for the subset used for the previous estimation. The TRS signal is designed so that aliasing is unlikely over the maximum time between consecutive TRS signals in a given subset, when the frequency estimate from the previous frequency estimation is used to resolve phase ambiguities.

Note that in some embodiments the first estimate is relative to the frequency used in the down conversion. The frequency used for the down conversion may be based on a frequency estimate done on a synchronization signal (SS) block or (e.g. in the case that SS block is not transmitted from the same point or by the same transmitter as the TRS and the data) it can be based on the accuracy of the oscillator in the UE or it can be based on a previous estimate based on the TRS.

In view of the above, some embodiments herein may be enumerated as follows:

Embodiment 1. A method performed by a radio node for frequency offset estimation, the method comprising: receiving a first set of reference symbols of a reference signal during respective time resources; determining a first frequency offset estimate using the first set of reference symbols; receiving a second set of reference symbols of the reference signal during respective time resources; and determining, based on the first frequency offset estimate, a second frequency offset estimate using the second set of reference symbols.

Embodiment 2. The method of embodiment 1, wherein the first set of reference symbols is a subset of the second set of reference symbols.

Embodiment 3. The method of any of embodiments 1-2, wherein at least one reference symbol included in the first set is also included in the second set.

Embodiment 4. The method of any of embodiments 1-3, wherein the first and second sets of reference symbols are received using the same local oscillator frequency for down conversion.

Embodiment 5. The method of any of embodiments 1-4, wherein determining the second frequency offset estimate comprises determining, based on the first frequency offset estimate, a phase of each reference symbol in the second set within a phase range greater than $2\pi$.

Embodiment 6. The method of embodiment 5, wherein determining the second frequency offset estimate further comprises calculating the second frequency offset estimate as a rate at which the determined phases vary over the time resources during which the second set of reference symbols are received.

Embodiment 7. The method of any of embodiments 5-6, wherein determining the phase of each reference symbol in the second set based on the first frequency offset estimate comprises rotating the reference symbols in the second set based on the first frequency offset estimate and determining the phase of each reference symbol in the second set as rotated.

Embodiment 8. The method of embodiment 7, wherein determining the phase of each reference symbol in the second set as rotated comprises: determining symbol-to-symbol phase changes over time across the reference symbols in the second set as rotated, with symbol-to-symbol phase changes being within a set of possible phase changes that has a range of $2\pi$; and determining, for each reference symbol in the second set, the phase of that reference symbol within a set of possible phases that has a range greater than $2\pi$ by calculating a partial sum of the symbol-to-symbol phase changes up to the time resource during which that reference symbol was received.

Embodiment 9. The method of any of embodiments 5-6, wherein determining the phase of each reference symbol in the second set based on the first frequency offset estimate comprises: determining symbol-to-symbol phase changes over time across the reference symbols in the second set, with symbol-to-symbol phase changes being within a set of possible phase changes that has a range of $2\pi$ and that is calculated based on the first frequency offset estimate; and determining, for each reference symbol in the second set, the phase of that reference symbol within a set of possible phases that has a range greater than $2\pi$ by calculating a partial sum of the symbol-to-symbol phase changes up to the time resource during which that reference symbol was received.

Embodiment 10. The method of any of embodiments 1-9, wherein determining the first frequency offset estimate comprises determining a phase of each reference symbol in the first set within a phase range greater than $2\pi$ and calculating the first frequency offset estimate as a rate at which the determined phases vary over the time resources during which the first set of reference symbols are received.

Embodiment 11. The method of embodiment 10, wherein determining the phase of each reference symbol in the first set comprises: determining symbol-to-symbol phase changes over time across the reference symbols in the first set, with symbol-to-symbol phase changes being within a set of possible phase changes that has a range of $2\pi$; and determining, for each reference symbol in the first set, the phase of that reference symbol within a set of possible phases that has a range greater than $2\pi$ by calculating a partial sum of the symbol-to-symbol phase changes up to the time resource during which that reference symbol was received.

Embodiment 12. The method of any of embodiments 1-11, further comprising determining a third frequency offset estimate as a function of the first and second frequency offset estimates.

Embodiment 13. The method of embodiment 12, comprising determining the third frequency offset estimate as a sum of the first and second frequency offset estimates Embodiment 14. The method of any of embodiments 1-13, further comprising tuning a local oscillator frequency or performing frequency offset compensation based on the second frequency offset estimate.

Embodiment 15. The method of embodiment 1, wherein the first and second sets of reference symbols are received using different local oscillator frequencies for down conversion, with the local oscillator frequency used to receive the second set of reference symbols being based on the first frequency offset estimate.

Embodiment 16. The method of any of embodiments 1-15, wherein the first and second sets of reference symbols differ in at least one reference symbol Embodiment 17. The method of any of embodiments 1-16, wherein the first set of reference symbols are received during respective time resources in a first set of time resources, wherein the second set of reference symbols are received during respective time resources in a second set of time resources, wherein the first set of time resources includes a first pair of time resources that are separated from one another in time by a first separation distance, with no reference symbol of the reference signal on any time resource between the first pair of time resources, and wherein the second set of time resources includes a second pair of time resources that are separated from one another in time by a second separation distance, with no reference symbol of the reference signal on any radio resource between the second pair of time resources, wherein the second separation distance is at least twice as large as the first separation distance.

Embodiment 18. The method of any of embodiments 1-17, wherein the first set of reference symbols are received during respective time resources in a first set of time resources, wherein the first set of time resources includes one or more pairs of time resources that are each separated from one another in time by a respective separation distance, with no reference symbol of the reference signal on any time resource between that pair of time resources, wherein the first separation distance is a maximum separation distance among the one or more respective separation distances of the one or more pairs included in the first set Embodiment 19. The method of any of embodiments 1-18, wherein the second set of reference symbols are received during respective time resources in a second set of time resources, wherein the second set of time resources includes one or more pairs of time resources that are each separated from one another in time by a respective separation distance, with no reference symbol of the reference signal on any time resource between that pair of time resources, wherein the second separation distance is a maximum separation distance among the one or more respective separation distances of the one or more pairs included in the second set.

Embodiment 20. The method of any of embodiments 1-19, wherein time resources on which the reference signal is received occur in periodically recurring bursts, wherein the first and second sets of reference symbols are received in the same burst.

Embodiment 21. The method of embodiment 20, wherein the first set of reference symbols occurs before the second set of reference symbols in the same burst.

Embodiment 22. The method of any of embodiments 1-19, wherein time resources on which the reference signal is received occur in periodically recurring bursts, wherein the first and second sets of reference symbols are received in different bursts.

Embodiment 23. The method of any of embodiments 20-22, wherein transmissions are performed in the wireless communication system according to a time slot structure in which each of multiple time slots includes multiple time resources, wherein a burst spans multiple consecutive time slots.

Embodiment 24. The method of any of embodiments 1 and 3-11, wherein the first and second sets of reference symbols are the same.

Embodiment 25. A radio node configured for use in a wireless communication system, the radio node configured to: receive a first set of reference symbols of a reference signal during respective time resources; determine a first frequency offset estimate using the first set of reference symbols; receive a second set of reference symbols of the reference signal during respective time resources; and determine, based on the first frequency offset estimate, a second frequency offset estimate using the second set of reference symbols as received or compensated based on the first frequency offset estimate Embodiment 26. The radio node of embodiment 25, configured to perform the method of any of embodiments 2-24

Embodiment 27. A radio node configured for use in a wireless communication system, the radio node comprising: processing circuitry and memory, the memory containing instructions executable by the processing circuitry whereby the radio node is configured to: receive a first set of reference symbols of a reference signal during respective time resources; determine a first frequency offset estimate using the first set of reference symbols; receive a second set of reference symbols of the reference signal during respective time resources; and determine, based on the first frequency offset estimate, a second frequency offset estimate using the second set of reference symbols as received or compensated based on the first frequency offset estimate.

Embodiment 28. The radio node of embodiment 27, configured to perform the method of any of embodiments 2-24.

Embodiment 29. A radio node configured for use in a wireless communication system, the radio node comprising: a first receiving module for receiving a first set of reference symbols of a reference signal during respective time resources; a first determining module for determining a first frequency offset estimate using the first set of reference symbols; a second receiving module for receiving a second set of reference symbols of the reference signal during respective time resources; and a second determining module for determining, based on the first frequency offset estimate, a second frequency offset estimate using the second set of reference symbols as received or compensated based on the first frequency offset estimate.

Embodiment 30. The radio node of embodiment 29, comprising one or more modules for performing the method of any of embodiments 2-24.

Embodiment 31. A computer program comprising instructions which, when executed by at least one processor of a radio node, causes the radio node to carry out the method of any of embodiments 1-24.

Embodiment 32. A carrier containing the computer program of embodiment 31, wherein the carrier is one of an electronic signal, optical signal, radio signal, or computer readable storage medium.

Embodiment 33. A method performed by a wireless device configured for use in a wireless communication system, the method comprising: receiving reference symbols of a reference signal, including receiving first and second pairs of the reference symbols on first and second pairs of radio resources that are separated from one another in time by first and second offsets that are different; determining a first frequency offset estimate using the first pair of reference symbols; determining a second frequency offset estimate using the second pair of reference symbols as received or compensated based the first frequency offset estimate; and determining a final frequency offset estimate as a function of the first frequency offset estimate and the second frequency offset estimate.

The invention claimed is:

1. A method performed by a radio node for frequency offset estimation, wherein the radio node is configured for use in a wireless communication system, the method comprising:
receiving a first set of reference symbols of a reference signal during respective time resources;
determining a first frequency offset estimate using the first set of reference symbols;
receiving a second set of reference symbols of the reference signal during respective time resources; and
determining, based on the first frequency offset estimate, a second frequency offset estimate using the second set of reference symbols;
wherein time resources on which the reference signal is received occur in periodically recurring bursts, wherein the first and second sets of reference symbols are received in the same burst, wherein the first set of reference symbols occurs before the second set of reference symbols in the same burst, wherein transmissions are performed in the wireless communication system according to a time slot structure in which each of multiple time slots includes multiple time resources, and wherein a burst spans multiple consecutive time slots.

2. The method of claim 1, wherein the first and second sets of reference symbols differ in at least one reference symbol, and wherein the first set of reference symbols is a subset of the second set of reference symbols.

3. The method of claim 1, wherein the first and second sets of reference symbols are received using the same local oscillator frequency for down conversion or are received using different local oscillator frequencies for down conversion, with the local oscillator frequency used to receive the second set of reference symbols being based on the first frequency offset estimate.

4. The method of claim 1, wherein determining the second frequency offset estimate comprises:
determining, based on the first frequency offset estimate, a phase of each reference symbol in the second set within a phase range greater than $2\pi$; and
calculating the second frequency offset estimate as a rate at which the determined phases vary over the time resources during which the second set of reference symbols are received.

5. The method of claim 4, wherein determining the phase of each reference symbol in the second set based on the first frequency offset estimate comprises:
determining symbol-to-symbol phase changes over time across the reference symbols in the second set, with symbol-to-symbol phase changes being within a set of possible phase changes that has a range of $2\pi$ and that is calculated based on the first frequency offset estimate; and
determining, for each reference symbol in the second set, the phase of that reference symbol within a set of possible phases that has a range greater than $2\pi$ by calculating a partial sum of the symbol-to-symbol phase changes up to the time resource during which that reference symbol was received.

6. The method of claim 1, wherein determining the first frequency offset estimate comprises determining a phase of each reference symbol in the first set within a phase range greater than $2\pi$ and calculating the first frequency offset estimate as a rate at which the determined phases vary over the time resources during which the first set of reference symbols are received, wherein determining the phase of each reference symbol in the first set comprises:
determining symbol-to-symbol phase changes over time across the reference symbols in the first set, with symbol-to-symbol phase changes being within a set of possible phase changes that has a range of $2\pi$; and
determining, for each reference symbol in the first set, the phase of that reference symbol within a set of possible phases that has a range greater than $2\pi$ by calculating a partial sum of the symbol-to-symbol phase changes up to the time resource during which that reference symbol was received.

7. The method of claim 1, further comprising:
determining a third frequency offset estimate as a sum of the first and second frequency offset estimates; and
tuning a local oscillator frequency, or performing frequency offset compensation, based on the third frequency offset estimate.

8. The method of claim 1, wherein the first set of reference symbols are received during respective time resources in a first set of time resources, wherein the second set of reference symbols are received during respective time resources in a second set of time resources, wherein the first set of time resources includes a first pair of time resources that are separated from one another in time by a first separation distance, with no reference symbol of the reference signal on any time resource between the first pair of time resources, and wherein the second set of time resources includes a second pair of time resources that are separated from one another in time by a second separation distance, with no reference symbol of the reference signal on any radio resource between the second pair of time resources, wherein the second separation distance is at least twice as large as the first separation distance.

9. A radio node configured for use in a wireless communication system, the radio node comprising:
  radio circuitry; and
  processing circuitry configured to:
    receive via the radio circuitry a first set of reference symbols of a reference signal during respective time resources;
    determine a first frequency offset estimate using the first set of reference symbols;
    receive via the radio circuitry a second set of reference symbols of the reference signal during respective time resources; and
    determine, based on the first frequency offset estimate, a second frequency offset estimate using the second set of reference symbols as received or compensated based on the first frequency offset estimate;
  wherein time resources on which the reference signal is received occur in periodically recurring bursts, wherein the first and second sets of reference symbols are received in the same burst, wherein the first set of reference symbols occurs before the second set of reference symbols in the same burst, wherein transmissions are performed in the wireless communication system according to a time slot structure in which each of multiple time slots includes multiple time resources, and wherein a burst spans multiple consecutive time slots.

10. The radio node of claim 9, wherein the first and second sets of reference symbols differ in at least one reference symbol, and wherein the first set of reference symbols is a subset of the second set of reference symbols.

11. The radio node of claim 9, wherein the first and second sets of reference symbols are received using the same local oscillator frequency for down conversion or are received using different local oscillator frequencies for down conversion, with the local oscillator frequency used to receive the second set of reference symbols being based on the first frequency offset estimate.

12. The radio node of claim 9, wherein the processing circuitry is configured to determine the second frequency offset estimate by:
  determining, based on the first frequency offset estimate, a phase of each reference symbol in the second set within a phase range greater than $2\pi$; and
  calculating the second frequency offset estimate as a rate at which the determined phases vary over the time resources during which the second set of reference symbols are received.

13. The radio node of claim 12, wherein the processing circuitry is configured to determine the phase of each reference symbol in the second set based on the first frequency offset estimate by:
  determining symbol-to-symbol phase changes over time across the reference symbols in the second set, with symbol-to-symbol phase changes being within a set of possible phase changes that has a range of $2\pi$ and that is calculated based on the first frequency offset estimate; and
  determining, for each reference symbol in the second set, the phase of that reference symbol within a set of possible phases that has a range greater than $2\pi$ by calculating a partial sum of the symbol-to-symbol phase changes up to the time resource during which that reference symbol was received.

14. The radio node of claim 9, wherein the processing circuitry is configured to determine the first frequency offset estimate by determining a phase of each reference symbol in the first set within a phase range greater than $2\pi$ and calculating the first frequency offset estimate as a rate at which the determined phases vary over the time resources during which the first set of reference symbols are received, wherein the processing circuitry is configured to determine the phase of each reference symbol in the first set by:
  determining symbol-to-symbol phase changes over time across the reference symbols in the first set, with symbol-to-symbol phase changes being within a set of possible phase changes that has a range of $2\pi$; and
  determining, for each reference symbol in the first set, the phase of that reference symbol within a set of possible phases that has a range greater than $2\pi$ by calculating a partial sum of the symbol-to-symbol phase changes up to the time resource during which that reference symbol was received.

15. The radio node of claim 9, the processing circuitry is further configured to:
  determine a third frequency offset estimate as a sum of the first and second frequency offset estimates; and
  tune a local oscillator frequency, or perform frequency offset compensation, based on the third frequency offset estimate.

16. The radio node of claim 9, wherein the first set of reference symbols are received during respective time resources in a first set of time resources, wherein the second set of reference symbols are received during respective time resources in a second set of time resources, wherein the first set of time resources includes a first pair of time resources that are separated from one another in time by a first separation distance, with no reference symbol of the reference signal on any time resource between the first pair of time resources, and wherein the second set of time resources includes a second pair of time resources that are separated from one another in time by a second separation distance, with no reference symbol of the reference signal on any radio resource between the second pair of time resources, wherein the second separation distance is at least twice as large as the first separation distance.

17. A method performed by a radio node for frequency offset estimation, the method comprising:
  receiving a first set of reference symbols of a reference signal during respective time resources;
  determining a first frequency offset estimate using the first set of reference symbols;
  receiving a second set of reference symbols of the reference signal during respective time resources; and
  determining, based on the first frequency offset estimate, a second frequency offset estimate using the second set of reference symbols, wherein determining the second frequency offset estimate comprises determining the phase of each reference symbol in the second set by:
    determining symbol-to-symbol phase changes over time across the reference symbols in the second set, with symbol-to-symbol phase changes being within a set of possible phase changes that has a range of $2\pi$ and that is calculated based on the first frequency offset estimate; and determining, for each reference symbol in the second set, the phase of that reference symbol within a set of possible phases that has a range greater than 2π by calculating a partial sum of the symbol-to-symbol phase changes up to the time resource during which that reference symbol was received.

18. The method of claim 17, wherein the first set of reference symbols is a subset of the second set of reference symbols.

19. The method of claim 17, wherein the first and second sets of reference symbols are received using the same local oscillator frequency for down conversion or are received using different local oscillator frequencies for down conversion, with the local oscillator frequency used to receive the second set of reference symbols being based on the first frequency offset estimate.

20. The method of claim 17, wherein determining the first frequency offset estimate comprises determining a phase of each reference symbol in the first set within a phase range greater than 2π and calculating the first frequency offset estimate as a rate at which the determined phases vary over the time resources during which the first set of reference symbols are received, wherein determining the phase of each reference symbol in the first set comprises:
  determining symbol-to-symbol phase changes over time across the reference symbols in the first set, with symbol-to-symbol phase changes being within a set of possible phase changes that has a range of 2π; and
  determining, for each reference symbol in the first set, the phase of that reference symbol within a set of possible phases that has a range greater than 2π by calculating a partial sum of the symbol-to-symbol phase changes up to the time resource during which that reference symbol was received.

21. The method of claim 17, further comprising:
  determining a third frequency offset estimate as a sum of the first and second frequency offset estimates; and
  tuning a local oscillator frequency, or performing frequency offset compensation, based on the third frequency offset estimate.

22. The method of claim 17, wherein the first set of reference symbols are received during respective time resources in a first set of time resources, wherein the second set of reference symbols are received during respective time resources in a second set of time resources, wherein the first set of time resources includes a first pair of time resources that are separated from one another in time by a first separation distance, with no reference symbol of the reference signal on any time resource between the first pair of time resources, and wherein the second set of time resources includes a second pair of time resources that are separated from one another in time by a second separation distance, with no reference symbol of the reference signal on any radio resource between the second pair of time resources, wherein the second separation distance is at least twice as large as the first separation distance.

23. A radio node configured for use in a wireless communication system, the radio node comprising:
  radio circuitry; and
  processing circuitry configured to:
    receive via the radio circuitry a first set of reference symbols of a reference signal during respective time resources;
    determine a first frequency offset estimate using the first set of reference symbols;
    receive via the radio circuitry a second set of reference symbols of the reference signal during respective time resources; and
    determine, based on the first frequency offset estimate, a second frequency offset estimate using the second set of reference symbols, wherein determination of the second frequency offset estimate comprises determining the phase of each reference symbol in the second set by:
      determining symbol-to-symbol phase changes over time across the reference symbols in the second set, with symbol-to-symbol phase changes being within a set of possible phase changes that has a range of 2π and that is calculated based on the first frequency offset estimate; and
      determining, for each reference symbol in the second set, the phase of that reference symbol within a set of possible phases that has a range greater than 2π by calculating a partial sum of the symbol-to-symbol phase changes up to the time resource during which that reference symbol was received.

24. The radio node of claim 23, wherein the first set of reference symbols is a subset of the second set of reference symbols.

25. The radio node of claim 23, wherein the first and second sets of reference symbols are received using the same local oscillator frequency for down conversion or are received using different local oscillator frequencies for down conversion, with the local oscillator frequency used to receive the second set of reference symbols being based on the first frequency offset estimate.

26. The radio node of claim 23, wherein determination of the first frequency offset estimate comprises determining a phase of each reference symbol in the first set within a phase range greater than 2π and calculating the first frequency offset estimate as a rate at which the determined phases vary over the time resources during which the first set of reference symbols are received, wherein determining the phase of each reference symbol in the first set comprises:
  determining symbol-to-symbol phase changes over time across the reference symbols in the first set, with symbol-to-symbol phase changes being within a set of possible phase changes that has a range of 2π; and
  determining, for each reference symbol in the first set, the phase of that reference symbol within a set of possible phases that has a range greater than 2π by calculating a partial sum of the symbol-to-symbol phase changes up to the time resource during which that reference symbol was received.

27. The radio node of claim 23, wherein the processing circuitry is further configured to:
  determine a third frequency offset estimate as a sum of the first and second frequency offset estimates; and
  tune a local oscillator frequency, or performing frequency offset compensation, based on the third frequency offset estimate.

28. The radio node of claim 23, wherein the first set of reference symbols are received during respective time resources in a first set of time resources, wherein the second set of reference symbols are received during respective time resources in a second set of time resources, wherein the first set of time resources includes a first pair of time resources that are separated from one another in time by a first separation distance, with no reference symbol of the reference signal on any time resource between the first pair of time resources, and wherein the second set of time resources includes a second pair of time resources that are separated from one another in time by a second separation distance, with no reference symbol of the reference signal on any radio resource between the second pair of time resources, wherein the second separation distance is at least twice as large as the first separation distance.

\* \* \* \* \*